(12) United States Patent
Easton et al.

(10) Patent No.: US 6,516,694 B1
(45) Date of Patent: Feb. 11, 2003

(54) ROLL-TRIMMING MACHINE

(75) Inventors: Richard L. Easton, Angola, IN (US); Jerry Bystry, Orland, IN (US); Patrick Rasler, LaGrange, IN (US); Richard Horr, Angola, IN (US)

(73) Assignee: SOS Service, Inc., Angola, IN (US)

( * ) Notice: Subject to any disclaimer, the term of this patent is extended or adjusted under 35 U.S.C. 154(b) by 0 days.

(21) Appl. No.: 09/680,773

(22) Filed: Oct. 6, 2000

Related U.S. Application Data

(63) Continuation-in-part of application No. 09/370,746, filed on Aug. 9, 1999, now Pat. No. 6,269,719.
(60) Provisional application No. 60/204,051, filed on May 12, 2000.

(51) Int. Cl.[7] ................................................ B26D 3/00
(52) U.S. Cl. ........................... 83/54; 83/647.5; 83/649; 83/928; 269/17; 269/296
(58) Field of Search ............................... 82/78, 83, 100, 82/101; 83/54, 397, 490, 581, 647.9, 649, 928; 266/54, 56; 254/2 R; 269/17, 43, 56, 296

(56) References Cited

U.S. PATENT DOCUMENTS

| | | | |
|---|---|---|---|
| 2,512,164 A | 6/1950 | Mann | |
| 2,752,998 A | 7/1956 | Ferguson | |
| 3,174,369 A | 3/1965 | Denk et al. | |
| 3,213,731 A | 10/1965 | Renard | |
| 3,213,734 A | 10/1965 | Nystrand | |
| 3,292,470 A | 12/1966 | Nystrand et al. | |
| 3,776,070 A | 12/1973 | Stoffels | |
| 4,020,726 A | 5/1977 | Coats | |
| 4,075,916 A | 2/1978 | Fisher | |
| 4,476,761 A | 10/1984 | Bird | |
| 4,564,178 A | * | 1/1986 | Steffe .......................... 269/296 |
| 4,579,025 A | 4/1986 | Fasolak | |
| 4,599,034 A | * | 7/1986 | Kennedy et al. ............. 269/296 |
| 4,864,906 A | 9/1989 | Hall | |
| 5,060,456 A | 10/1991 | Wehrli | |
| 5,271,137 A | 12/1993 | Schutz | |
| 5,367,930 A | 11/1994 | Lemley | |
| 5,410,929 A | 5/1995 | Wallace | |
| 5,453,070 A | 9/1995 | Moody | |
| 6,269,719 B1 | * | 8/2001 | Easton et al. ................. 83/928 |
| 6,322,061 B1 | * | 11/2001 | Maser et al. ................... 269/17 |

OTHER PUBLICATIONS

Exhibits A and B are descriptions of a roll trimming machine that was in public use more than one year prior to the filing date of this application.

* cited by examiner

Primary Examiner—W. Donald Bray
(74) Attorney, Agent, or Firm—Van Dyke, Gardner, Linn & Burkhart, LLP

(57) ABSTRACT

A machine for cutting damaged ends off of rolls of wound sheet material includes a saw that moves in a circular motion about the circumference of one end of the roll of material. The circular motion of the saw is coupled with a movement of the saw radially inward toward the center of the axis of the circular movement. The roll is thereby cut in ever increasing depths about its circumference. The machine is mounted on a portable hydraulic lift and controlled by a remote controller positioned a safe distance away from the saw. The machine and the roll of material can be more easily aligned through the use of an alignment track.

19 Claims, 22 Drawing Sheets

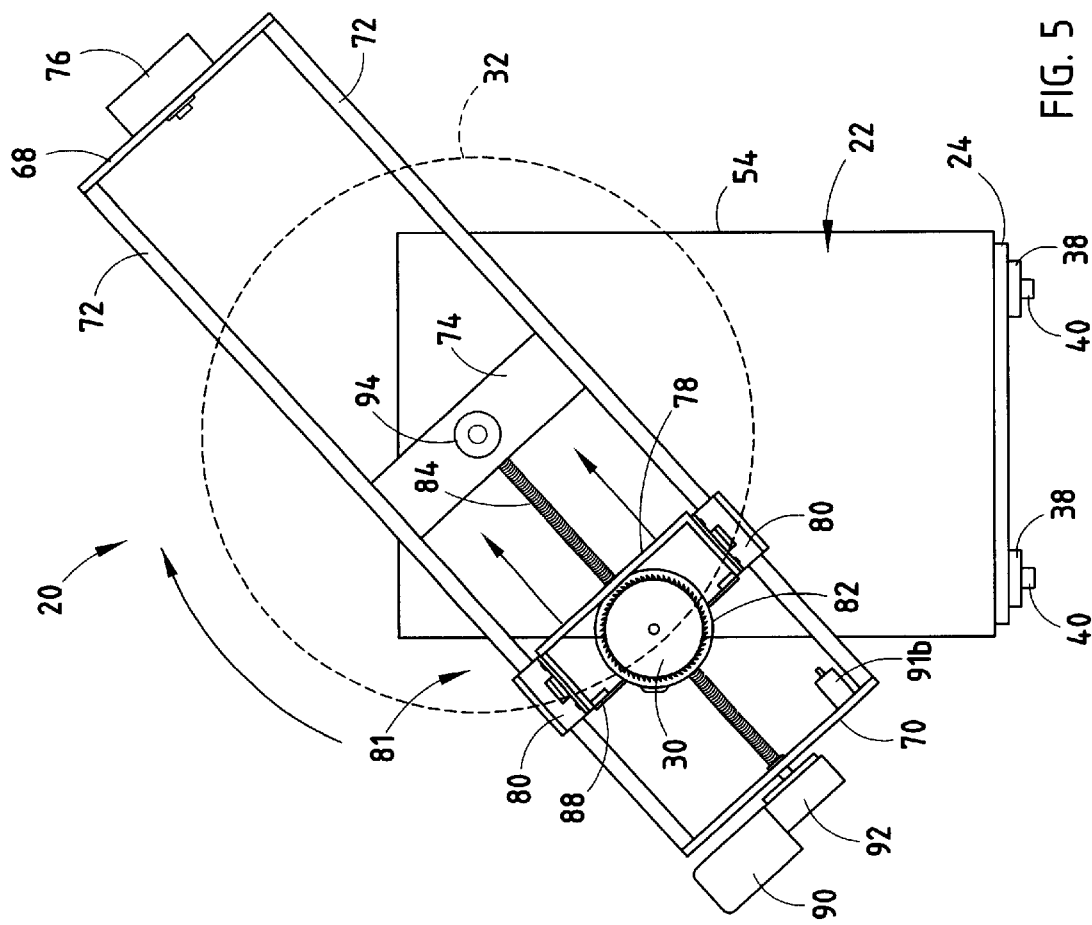
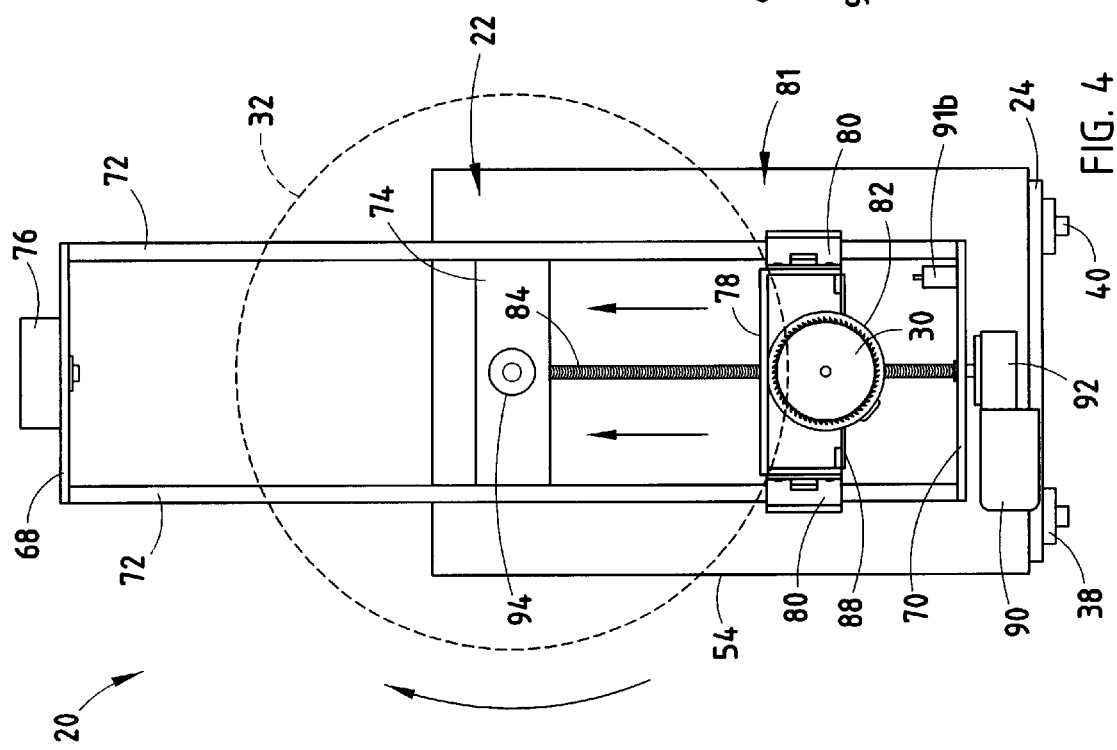

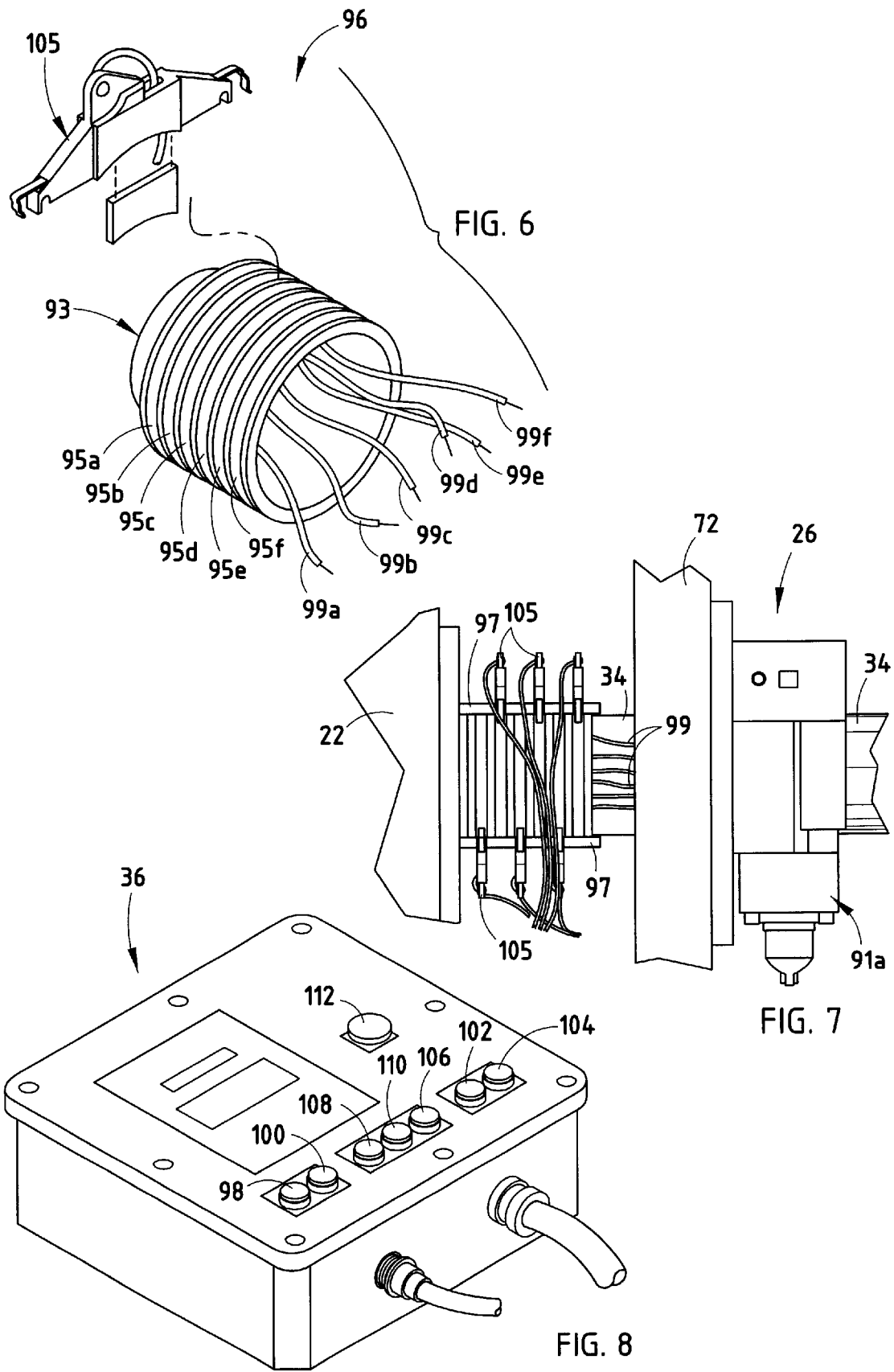

ROLL-TRIMMING MACHINE

This application claims priority to both U.S. provisional patent application Serial No. 60/204,051, filed May 12, 2000, entitled Roll-Trimming Machine, and is a continuation-in-part of U.S. nonprovisional patent application Ser. No. 09/370,746, filed Aug. 9, 1999, and now U.S. Pat. No. 6,269,719 entitled Roll-Trimming Machine. This invention generally relates to a method and device for cutting the ends off of rolls of rolled sheet materials, especially paper.

BACKGROUND OF THE INVENTION

A number of industries make use of large rolls of sheet material, such as paper. When these rolls of sheet material are moved within a warehouse, or moved between warehouses, it occasionally happens that one or both of the ends of the paper roll become damaged. Such damage can result from a variety of different mishaps. When such mishaps occur, it is desirable to still use the original paper roll to as great extent as possible. In this way, the entire roll does not have to be discarded because of one or more damaged ends. In order to preserve and make use of the damaged roll of sheet material, it is desirable to remove the damaged portions of the roll of sheet material. This is accomplished by cutting the damaged portion, or portions, of the roll off so that the remaining, undamaged portions can be used. The roll of sheet material may also be desirably cut simply to re-size the roll of sheet material, regardless of any damage.

In the past, the methods for removing the ends of rolls of sheet material have been cumbersome and time-consuming. Typically, the rolls could only be cut in a warehouse which had large, stationary machinery permanently on hand for dealing with the cutting of the rolls. Oftentimes, the paper rolls had to be reoriented so that their longitudinal axis pointed vertically before they could be cut by the roll-trimming machines. When the paper roll was oriented vertically, the end was cut off of the top of the paper roll. The cutting, therefore, typically took place at an elevated height in the warehouse. Often an operator of the roll-trimming machine was required to position himself at an elevated height in order to operate the machine. Working at such an elevated height increases the potential dangers to an operator of the equipment. Additionally, the act of reorienting the paper roll to a vertical orientation requires fairly significant time and labor. It is desirable to eliminate or reduce this time and labor.

When rolls of paper, or other sheet material, are cut, there is typically a significant amount of dust and debris which is generated by the cut. When a roll of paper is oriented vertically, the paper dust is typically free to fall completely over the paper roll itself. Because the cutting is performed at a higher vertical height, the paper dust also falls a greater distance and has a tendency to otherwise spread out to a greater degree. The containment of such dust to as small a confined area as possible is desirable. The smaller the area of dust, the easier the subsequent clean up. The act of cutting an end of a roll of sheet material off of the roll also normally entails a number of safety considerations. The safety considerations deal in great part with the issue of ensuring the safety of an operator while he or she is working in close proximity to a powerful saw blade. The Occupational Safety and Health Administration (OSHA) includes regulations dealing with such situations. These OSHA safety regulations have often, in the past, required special designs for the cutting machine, or special procedures for using the machine. It is desirable to have a paper-cutting machine that meets all safety standards while not requiring expensive or complicated engineering or designs.

SUMMARY OF THE INVENTION

According to one aspect of the present invention, a wheeled, portable paper-cutting machine is provided for cutting the ends off of rolls of paper. By having a portable paper-cutting machine, it is not necessary to move the paper roll to the cutting machine, but rather the cutting machine can be moved to the paper roll. This can greatly improve the efficiency of salvaging the damaged paper roll or re-sizing an undamaged roll, with a minimum of disruption in the overall operations of the warehouse.

According to another aspect of the invention, a method is provided for cutting the ends off of rolls of wound sheet material. The sheet material which is to be cut is rolled on a core, and a saw blade and center shaft are provided. The center shaft is aligned with the core of the sheet material, and the saw blade is rotated around the circumference of the roll of material. As the saw blade rotates around the circumference of the roll of material, the distance between the saw blade and the center shaft is decreased. This decreasing distance causes the saw blade to cut into the roll of paper and eventually cut off an end of the roll of sheet material.

According to yet another aspect of the invention, a roll-trimming machine comprises a trailer, a support, a saw, and an adjustment mechanism. The trailer is adapted to be hitched onto a car or truck. The support is for holding a roll of sheet material and is mounted on the trailer. The saw is provided for cutting an end off the roll. The adjustment mechanism adjusts the position of the support with respect to the saw in order to properly align the roll of sheet material with the saw.

In yet another aspect of the invention, a roll-trimming machine includes a saw, a first and second cart, and a controller. The carts are both mounted on wheels and support the two ends of the roll of sheet material. The controller operates the saw such that the end of the roll of the sheet material can be trimmed by the saw.

According to other aspects of the present invention, a roll-trimming machine for cutting the ends off of a roll of wound sheet material is provided. The roll-trimming machine includes a base on which a center shaft is mounted. A rotary arm is mounted to rotate around a longitudinal axis defined by the center shaft. A saw is mounted on one end of the rotary arm, and a drive is provided which is adapted to move the saw toward the longitudinal axis of the center shaft while the rotary arm rotates.

The embodiments of the present invention provide a simple and efficient manner for trimming the ends off of rolls of sheet material, such as paper. The portable nature of the roll-trimming machine allows the machine to be moved to the site of the damaged paper roll, rather than requiring the paper roll to be moved. The roll-trimming machine is designed to be used for trimming the ends off of a roll while the roll is horizontally oriented, rather than vertically oriented. This simplifies the roll-trimming process. The portability and simplicity of the roll-trimming machine allow it to be used by customers who otherwise might not be able to afford the capital investment of a permanent roll cutter positioned in their plant. Because of its portability, the roll-trimming machine of the present invention can be rented to customers when the need arises or used as part of a roll-trimming service provided by a third party.

BRIEF DESCRIPTION OF THE DRAWINGS

FIG. 4 is a front, elevational view of the roll-trimming machine with a vertically oriented rotary arm;

FIG. 5 is a front, elevational view of the roll-trimming machine of FIG. 4 wherein the rotary arm has rotated clockwise about forty-five (45°) degrees;

FIG. 6 is a perspective view of a slip-ring assembly depicted with a single ring;

FIG. 7 is a partial, side-elevational view of a slip-ring assembly and adjacent components on the roll-trimming machine;

FIG. 8 is a perspective view of one embodiment of a control box for controlling the roll-trimming machine;

DETAILED DESCRIPTION OF THE PREFERRED EMBODIMENTS

Figure 1:
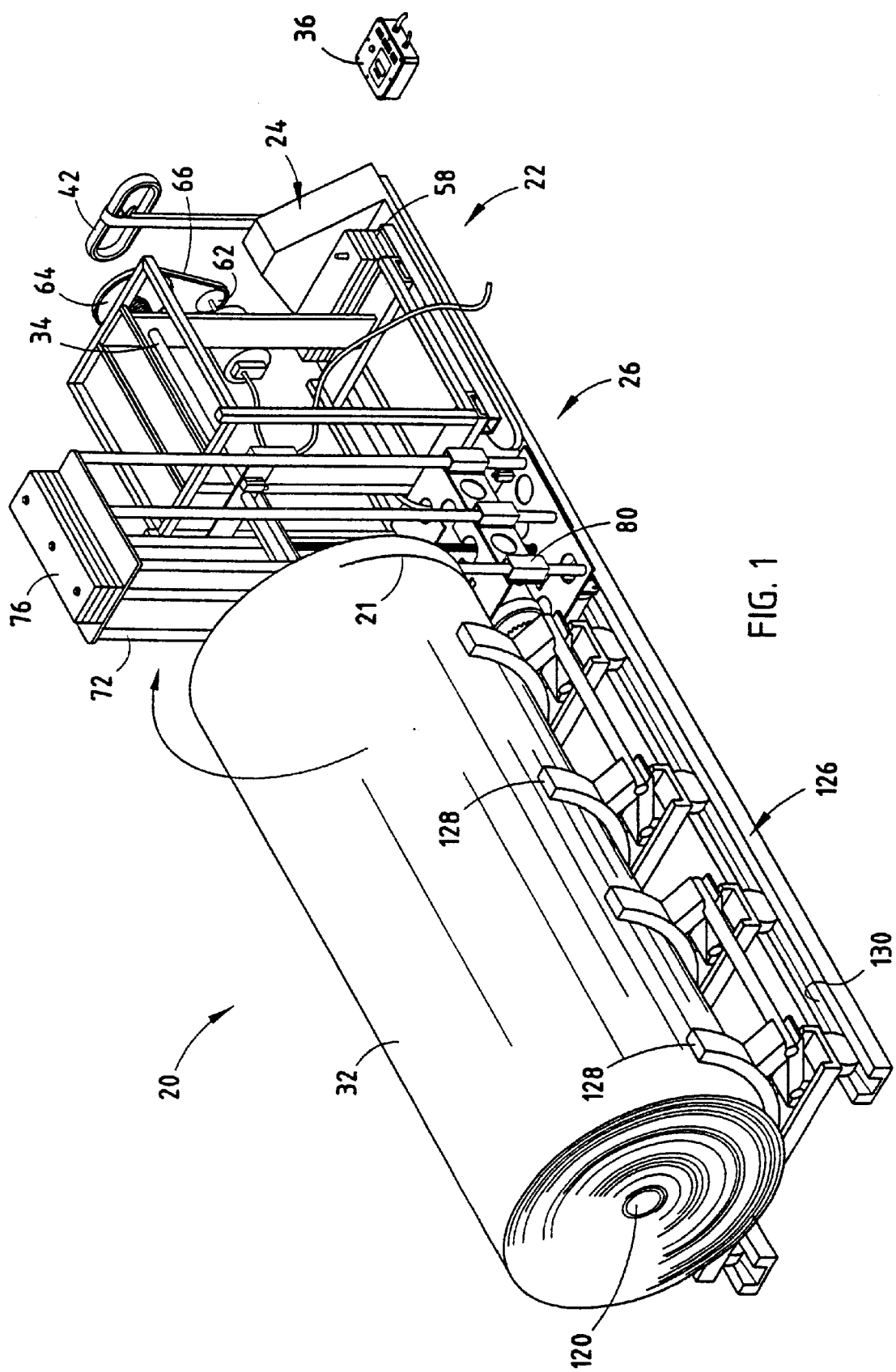
FIG. 1 is a perspective view of a roll-trimming machine according to one embodiment of the present invention shown positioned on an alignment track with a roll of sheet material which is to be trimmed.

The present invention will now be described with reference to the accompanying drawings wherein like reference numerals correspond to like elements in the several drawings.

Figure 2:
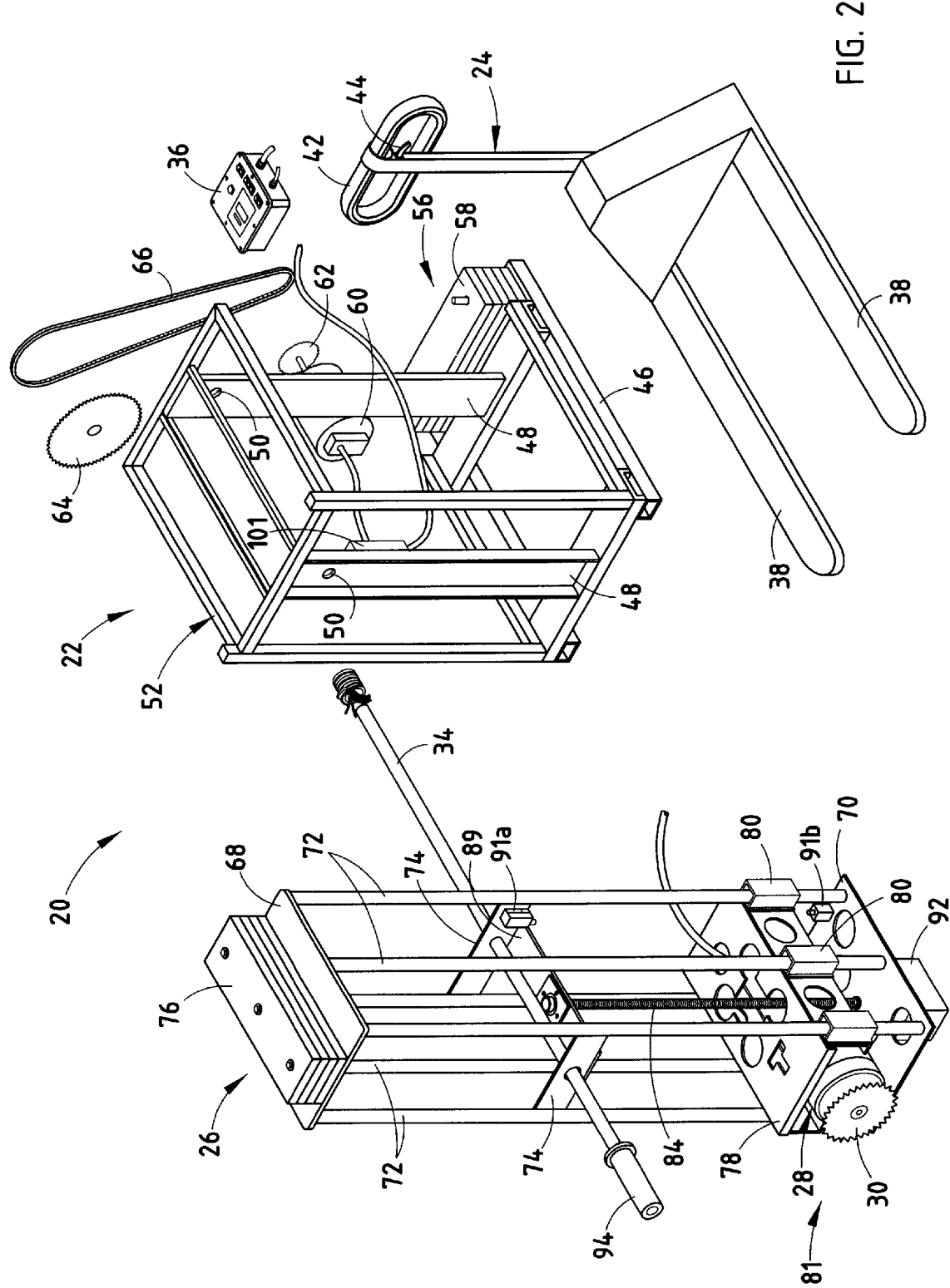
FIG. 2 is an exploded, perspective view of the roll-trimming machine of FIG. 1.

A roll-trimming machine 20 according to one embodiment of the present invention is depicted in FIGS. 1 and 2. Roll-trimming machine 20 provides a safe and easy device for salvaging rolls of sheet material by cutting off any damaged ends they may have. While roll-trimming machine 20 is primarily designed for cutting rolls of paper, it will be understood that other types of wound sheet material could be cut. For purposes of description herein, roll-trimming machine 20 will be described for use with a paper roll with the understanding that other types of sheet material can be used.

Roll-trimming machine 20 generally includes a base 22 which is mounted on a hydraulic lift 24. A rotary arm unit 26 is rotatably mounted on base 22. A saw 28 is mounted on one end of rotary arm unit 26 and includes a flush face saw blade 30 which cuts a roll of paper or other sheet material 32 at a desired location. The cutting of roll 32 is accomplished by rotating rotary arm unit 26 about a center shaft 34 while simultaneously moving saw 28 radially inward toward center shaft 34. This type of saw motion cuts the paper 32 by cutting the roll about its circumference in ever-increasing depths until the core of the roll has been reached. The beginning portion of a cut line 21 is shown in FIG. 1 as the saw rotates in the direction of the arrow. The control of roll-trimming machine 20 is carried out by a remote control box 36 which is electrically coupled to the roll-trimming machine by one or more wires. The wires are preferably long enough to allow the operator to be positioned at a safe distance away from the roll-trimming machine 20 while it is being operated.

Base 22 is mounted on a standard hydraulic lift 24 that includes two fork prongs 38 for lifting and moving pallets by hand (FIGS. 1 and 2). Base 22, in the current embodiment, is permanently affixed to fork prongs 38 of hydraulic lift 24. Hydraulic lift 24 includes one or more wheels 40 on its bottom side (FIGS. 4 and 5) which allow it to be pushed to any desirable location. Hydraulic lift 24 further includes a handle 42 which can pivot downward and away from fork prongs 38. The downward pivoting of handle 42 causes the fork prongs 38 to elevate higher and higher. A release lever 44 on handle 42 allows the fork prongs 38 to descend for as long as the release lever 44 is activated. Hydraulic lift 24 thereby allows adjustments to be made in the height of base 22, including center shaft 34. In an alternative embodiment, base 22 could be mounted onto the prongs of a forklift truck, if desired. Such an arrangement would give the roll-trimming machine a greater range of height adjustability and allow it to be transported more easily.

Base 22 includes a bottom 46 on which a pair of shaft supports 48 are fixedly secured (FIGS. 1 and 2). Shaft supports 48 are oriented generally vertically and each includes a shaft aperture 50 at its top end. Shaft apertures 50 are aligned with each other and are adapted to rotatably support center shaft 34. A frame 52 is also mounted to bottom 46 and generally defines a box-like structure. Frame 52 is generally shaped the same as a cover 54 (see FIGS. 4 and 5) which fits over frame 52 and houses the interior of base 22. Cover 54 also prevents dust from collecting on the interior components and serves as a safety shield against the moving parts housed therein. A rear portion 56 of base 22 includes an area on bottom 46 for stacking a series of counterweights 58. Counterweights 58 are stacked in sufficient number to ensure that roll-trimming machine 20 does not tip forward at any time. Rear portion 56 of base 22 also includes a rotary motor 60 which is mounted to the rear shaft support 48 in the current embodiment. Rotary motor 60 includes a drive gear 62 which is rotated by rotary motor 60.

Drive gear 62 is coupled to a center shaft gear 64 by a chain 66. In the current embodiment, to achieve a desirable speed and torque, the diameter of center shaft gear 64 is substantially larger than the diameter of drive gear 62. As would be understood by one skilled in the art, various modifications to the ratio of drive gear 62 and center shaft gear 64 can be made. In the current embodiment, the arrangement of rotary motor 60, drive gear 62, and center shaft gear 64 is such that center shaft 34 will rotate at a speed in the general neighborhood of two revolutions per minute. Wide variations to this speed can, of course, be made, provided that an acceptable cut of the sheet material is still maintained.

Figure 3:
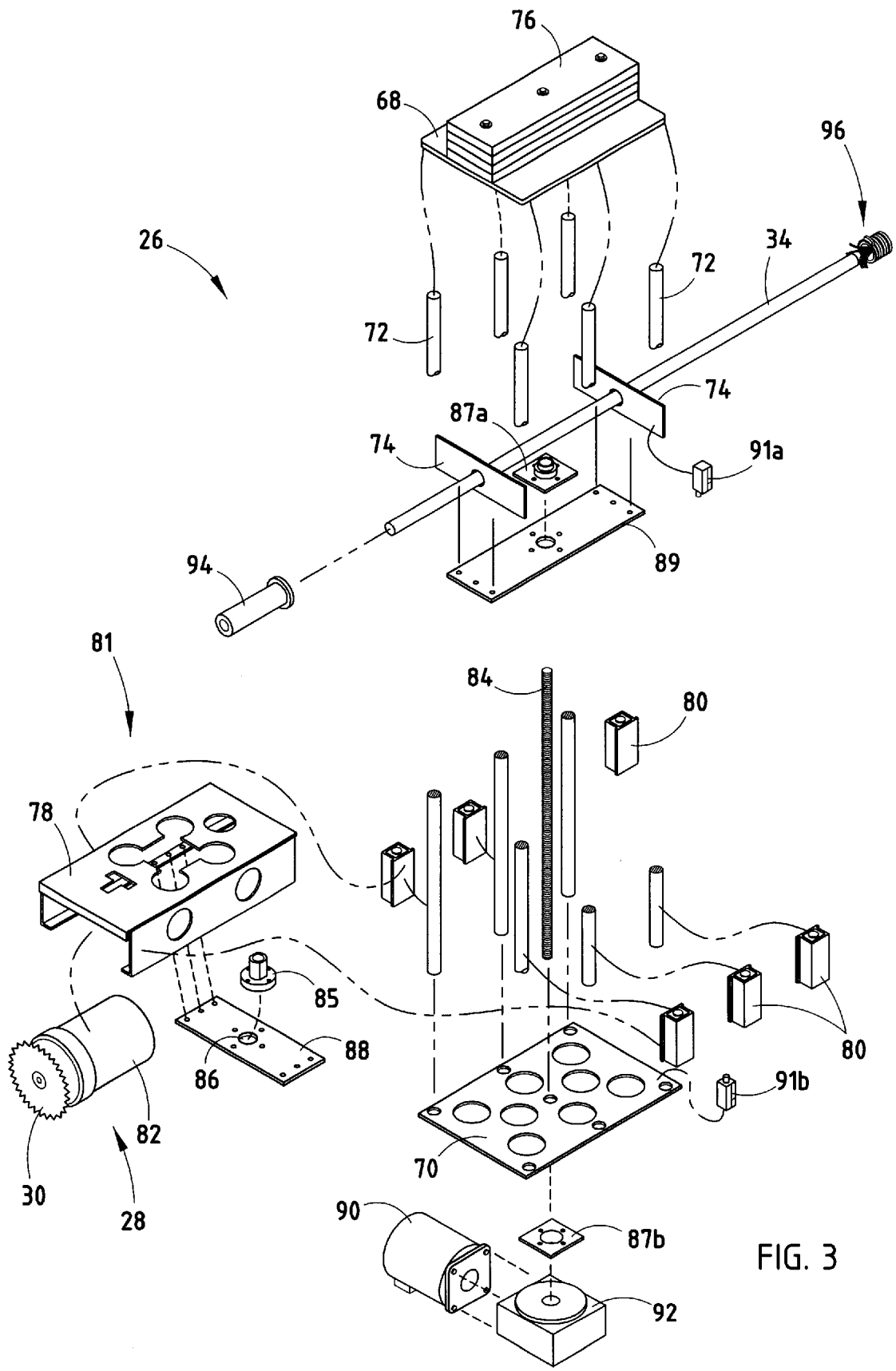
FIG. 3 is an exploded, perspective view of a rotary arm assembly.

Center shaft 34 is rotatably supported in shaft apertures 50 on shaft supports 48. Central shaft 34 extends forwardly from base 22 and supports rotary arm unit 26. Rotary arm unit 26 is thereby able to rotate with respect to base 22. Rotary arm unit 26 includes a top plate 68 and bottom plate 70 which are secured together by six connecting shafts 72 (FIGS. 1–3). Connecting shafts 72 are all oriented generally parallel to each other and are grouped in three pairs. A pair of center plates 74 are located midway between the ends of four of the connecting shafts 72. Center plates 74 connect the connecting shafts 72 to center shaft 34. A set of counterweights 76 are secured to one end of rotary arm unit 26 on top of top plate 68. Counterweights 76 are sufficient in number to provide a weight which substantially balances the weight on the opposite end of rotary arm unit 26. The rotation of rotary arm unit 26 is, therefore, balanced and does not create an eccentric motion.

A movable plate 78 is slidingly secured to connecting shafts 72 between top and bottom plates 68 and 70 (FIG. 3). A saw motor assembly 81 is slidingly secured to connecting shafts 72 by way of six linear bearings 80. Saw motor assembly 81 comprises a movable plate 78, a saw motor 82, an internally threaded cylindrical member 85, and a driving plate 88. Saw motor assembly 81 moves radially inwardly and outwardly from center shaft 34. The movement of saw motor assembly 81 toward and away from an axis defined by center shaft 34 causes saw motor 82 to likewise move toward and away from this axis. The movement of saw motor assembly 81 is actuated by a center, threaded shaft 84 which matingly engages an internally threaded cylindrical member 85. Threaded member 85 is mounted to driving plate 88 such that its internal cylindrical opening aligns with an aperture 86 defined in driving plate 88. Driving plate 88 and cylindrical member 85 are fixedly secured to the underside of movable plate 78. Rotation of center, threaded shaft 84 therefore causes driving plate 88 to move toward or away from center shaft 34, depending upon the direction of rotation of threaded shaft 84. Because driving plate 88 is fixedly secured to movable plate 78, which in turn has saw motor 82 secured to it, the entire saw motor assembly 81 moves when shaft 84 is rotated. The ends of threaded shaft 84 are mounted in a pair of end pieces 87*a* and *b* which allow shaft 84 to rotate. End piece 87*a* is mounted on top of a support member 89 which is, in turn, secured to the two center plates 74. End piece 87*b* is mounted to the underside of bottom plate 70.

The rotation of center, threaded shaft 84 is carried out by a feed motor 90 secured underneath bottom plate 70. Feed motor 90 is operatively coupled to a gearbox 92 which is also operatively coupled to threaded shaft 84. Activation of feed motor 90 therefore causes threaded shaft 84 to rotate, thereby moving saw motor assembly 81 either toward or away from center shaft 34. The movement of saw motor assembly 81 is partially controlled by a pair of limit switches 91*a* and *b*. Limit switches 91*a* and *b* are positioned adjacent center shaft 34 and bottom plate 70, respectively (see FIGS. 3 and 6). Each limit switch 91 is a battery-powered, radio signal-emitting switch. When saw motor assembly 81 moves radially inward toward center shaft 34, it will eventually contact limit switch 91*a*. When contact is made with switch 91*a*, it emits a radio signal to control box 36 which causes feed motor 90 to stop. In a similar manner, when saw motor assembly 81 moves radially outward to bottom plate 70, it eventually contacts limit switch 91*b*. Limit switch 91*b* will emit a radio signal to control box 36 which causes feed motor 90 to stop. Limit switches 91*a* and b thereby prevent motor assembly 81 from moving past the ends of threaded shaft 84. As described more fully below, the shutdown of feed motor 90 by limit switches 91*a* and b can be manually overridden, if necessary, to fully complete the cut.

Center shaft 34 includes a center guide 94 removably attached to the front end of center shaft 34. Center guide 94 is selectively removable to allow different center guides to be attached to center shaft 34, which correspond to varying diameters of the core of the roll of paper 32. In other words, center guides of varying diameter can be attached to center shaft 34 in order to match the diameter of the core of the roll of material which is to be trimmed. Center guide 94 is preferably made from an ultra-high molecular weight polypropylene. Center shaft 34 is made from a solid, cylindrical piece of steel in the current embodiment. Center shaft 34 extends forwardly from base 22 a sufficient distance to give center shaft 34 some flexibility at its forward-most end. This flexibility allows adjustments to be made in the alignment of shaft 34 with the axis of the paper roll 32, as described in more detail below.

FIGS. 4 and 5 depict the movement of rotary arm unit 26 and saw motor 82. In FIG. 5, rotary arm unit 26 is oriented generally vertically and saw motor 82 is positioned adjacent bottom plate 70 of rotary arm unit 26. In FIG. 5, rotary arm unit 26 has rotated roughly 45° in a clockwise direction while saw motor 82 has moved away from bottom plate 70 toward center shaft 34. In the current embodiment, it has been found that a rate of rotation of rotary arm unit 26 about center shaft 34 of roughly two to three revolutions per minute is acceptable. The speed of movement of saw motor 82 radially inward toward center shaft 34 is variable and dependent upon the circumference of the uncut portions of the paper at any given moment. When a roll of sheet material is first started to be cut, the saw must cut material around a greater diameter. Because of the greater diameter, it is desirable to have the saw move radially inward toward center shaft 34 at a slower speed during the initial portions of the cut. Thereafter, the speed of movement of saw motor 82 radially inward can be increased due to the reduced diameter of the uncut portions of the roll of sheet material. Feed motor 90, which controls the linear movement of saw motor 82, is, therefore, preferably a variable-speed motor. In the current embodiment, it has been found that a linear speed of saw motor 82 radially inward toward center shaft 34 of roughly one to two inches per minute is acceptable for cutting the outer diameter of a roll of sheet material. As noted, increases to this speed can be made as more material is cut. It will, of course, be understood by those skilled in the art that variations to the rotational speed of center shaft 34 and the linear speed of saw motor 82 can be made without departing from the principles of the present invention.

In the present embodiment, saw motor 82 includes a saw blade 30 which is a flush-cut blade. The face of saw blade 30 that faces the paper roll, therefore, is smooth, and there are no fasteners or other protrusions which extend forwardly from the saw blade toward the paper roll. This ensures that the resulting cut is completely smooth. It has been found that an acceptable cut can be accomplished by using a saw blade having a diameter of 7¼ inches and 24 teeth for a first, rough cut. Such a blade has been found to avoid the problem of paper getting stuck between the teeth which does not come free as the blade rotates. Saw blade 30, in the current embodiment, also has a kerf of ⅛ inch, although variations can, of course, be made to the saw blade size, teeth, and kerf. If material other than paper is being cut, a different type of blade may be more suitable, as would be understood by one skilled in the art.

After a first, rough cut has been made of the end of the paper roll, it is often desirable to smooth the cut end with a second, finishing cut. Such a second, finishing cut preferably uses the same diameter and same width saw blade, but has 40 teeth instead of 24. The larger number of teeth helps provide a smoother, more finished cut.

As saw motor assembly 81 rotates and moves radially inward, the cut end of the paper roll may obstruct the movement of saw motor assembly 81 by contacting the motor 82. This may be more of a problem if the amount of material being cut off the end of the roll is especially large. In order to avoid the problem of this obstruction, a series of cuts can be made into the end of the roll of paper with a hand saw, such as a Skil saw, prior to activating roll-trimming machine 20. The hand saw should be set to cut at a depth into the end of the paper roll that is equal to the length of the end being cut off. A series of cuts should be made with the hand saw that pass through the center of the paper roll, thus resulting in a pie-shaped arrangement of cuts. The hand saw cuts will allow the paper end being cut off to fall loosely to the ground as saw blade 30 moves radially inward. There will, therefore, be no paper build-up to obstruct the movement of saw motor 82.

In the current embodiment, rotary motor 60, saw motor 82, and feed motor 90 are all AC motors which receive their electrical power from a 220V AC power line. Of course, other voltages and types of power supplies could be used within the scope of the present invention. The delivery of power from base 22 to feed motor 90 and saw motor 82 is accomplished through the use of a slip-ring assembly 96 (see FIGS. 6 and 7). Slip-ring assembly 96 is a standard high amperage slip-ring assembly of sufficient diameter to accommodate center shaft 34. Slip-ring assembly 96 includes a ring cylinder 93 having a series of six separate conductive rings 95a–f. Ring cylinder 93 receives center shaft 34 and is securely fastened to it such that ring cylinder 93 will rotate with center shaft 34. Each of the rings is separately coupled to wires 99a–f. A series of six stationary contacts 105 are fixedly attached to base 22 by mounting pins 97. Each stationary contact 105 makes sliding electrical contact with one of the conductive rings 95a–f and thereby allows power to be delivered to the motors on rotary arm unit 26. Specifically, three of the rings 95 are coupled by three of wires 99 to feed motor 90. Two of rings 95 are coupled by two of the wires 99 to saw motor 82. The final ring 95 provides a ground coupling between rotary arm unit 26 and base 22.

The operation of rotary motor 60, saw motor 82, and feed motor 90 is controlled by control box 36 (FIG. 8). Control box 36 is positioned remotely from base 22 and operatively connected thereto by an electrical cable. The electrical cable is connected to a junction box 101 on base 22. Each of the motors on the roll-trimming machine receives its power through junction box 101. Control box 36 includes eight different buttons which are used for controlling roll-trimming machine 20. Start and stop buttons 98 and 100 are used to start and stop saw motor 82. Another set of start and stop buttons 102 and 104 are used to control rotary motor 60. A start, stop, and fast button 106, 108, and 110, respectively, are used to control feed motor 90. As mentioned previously, feed motor 90 is a variable-speed motor. By depressing the fast button 110 after feed motor 90 has been started, the rotation of feed motor 90 will progressively increase for as long as fast button 110 is depressed. By increasing the speed of feed motor 90, the rotation of center threaded shaft 84 will increase and, thereby, cause saw motor 82 to move radially inward toward center shaft 34 at a greater rate. An emergency stop button 112 is also located on control box 36. Depressing emergency stop button 112 causes all three of the motors located on roll-trimming machine 20 to immediately shut down.

Figure 9:
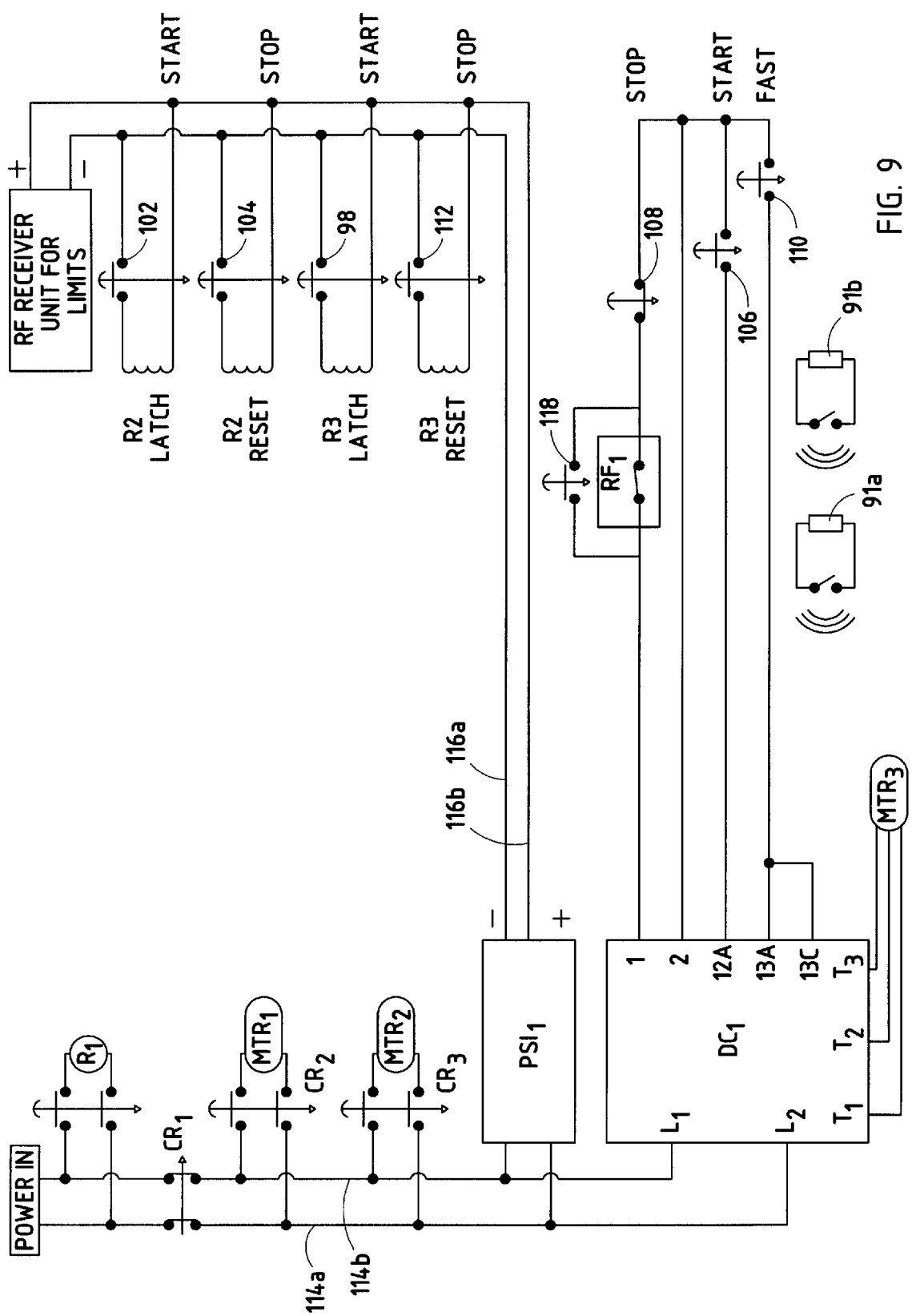
FIG. 9 is an electrical schematic diagram of the electrical control system of the motors of the roll-trimming machine.

FIG. 9 depicts an electrical schematic of control box 36. One of the main components in control box 36 is a programmable drive controller $DC_1$. Programmable drive controller $DC_1$ is a conventional variable-speed AC motor driver. In the current embodiment, drive controller $DC_1$ is a Model Number M1205SC marketed by AC Technology Corporation, of Oxbridge, Mass. Of course, any variable-speed motor controller could alternatively be used. A power supply $PS_1$ is also depicted in FIG. 9 and is coupled directly to a pair of power lines 114a and b. Power supply $PS_1$ converts the 220V AC power lines 114a and b to 12V DC output lines 116a and b. The emergency stop button 112 is positioned in series between power lines 114a and b and a relay $R_1$. When emergency stop button 112 is depressed, relay $R_1$ is activated and thereby causes control relay $CR_1$ to be activated in the direction shown by the corresponding arrow. The activation of control relay $CR_1$ disconnects power lines 114a and b from all of the motors on roll-trimming machine 20 and the remaining circuitry inside of control box 36.

Power supply $PS_1$ supplies power to a first latching relay $R_2$ and a second latching relay $R_3$, along with an RF receiver for the limit switches. When start button 102 is depressed, latch $R_2$ is activated causing control relay $CR_2$ to move in the direction indicated by the corresponding arrow. When control relay $CR_2$ moves as indicated, power is supplied directly from power lines 114a and b to rotary motor 60. When stop button 104 is depressed, latch $R_2$ is reset, and control relay $CR_2$ moves in the opposite direction, thereby interrupting the power to rotary motor 60 and stopping it. When start button 98 is depressed, latch $R_3$ activates control relay $CR_3$ in the direction indicated by the adjacent arrow. This activation of control relay $CR_3$ couples saw motor 82 directly to power lines 114a and b and thereby activates saw motor 82. Depressing stop button 100 resets latch $R_3$ and causes control relay $CR_3$ to interrupt the power flow to saw motor 82 and thereby stop it. The RF receiver which receives power from power supply $PS_1$ supplies power for switch $RF_1$ as discussed below.

Start, stop, and fast buttons 106, 108, and 110, respectively, are each operatively coupled to programmable drive controller $DC_1$. The designations $L_1$, $L_2$, $T_1$, and #1, etc., all refer to the terminals of the variable-speed AC motor drive manufactured by AC Technology, as discussed previously. Feed motor 90 is controlled by start, stop, and fast buttons as discussed above. A radio frequency limit switch $RF_1$ is connected in series between stop button 102 and an input #1 into drive controller $DC_1$. When either of the limit switches 91a and b on roll-trimming machine 20 is activated, a radio frequency signal is passed to control box 36 and opens switch $RF_1$. By opening switch $RF_1$, the feed motor 90 is stopped. A limit override switch 118 is connected in parallel to switch $RF_1$ and allows the opening of switch $RF_1$ to be manually overridden. Specifically, by depressing override switch 118, feed motor 90 can be operated despite the activation of either of the limit switches.

The operation of roll-trimming machine 20 is carried out by first inserting center shaft 34 into a core 120 on which the roll of sheet material is wound. This is accomplished by rolling the entire roll-trimming machine 20 straight towards the paper roll center core until the saw blade is located at a distance from the end of the roll that is equal to the amount of material that is to be cut off of the end of the roll. Because center shaft 34 may not be at precisely the same height as the core 120 of the sheet material roll 32, hydraulic lift 24 can be used to adjust the height of center shaft 34 as is necessary. Once the center shaft 34 and its center guide 94 are inserted into the core of the sheet material, rotary motor 60 is started in order to cause rotary arm unit 26 to begin to rotate. As rotary arm unit 26 rotates, the distance from the end of the roll to the cut-off point is confirmed at different points about the circumference of the paper roll. If the distance varies horizontally from left to right, the rear end of roll-trimming machine is adjusted either left or right to compensate for this horizontal variation. If the distance varies vertically from top to bottom, hydraulic lift 24 should be adjusted to raise or lower the rear end of roll-trimming machine 20. Because center shaft 34 is flexible, the raising or lowering of hydraulic lift 24 while center shaft 34 is inserted into the core of the sheet material roll will remove any vertical variations in the cut-off point. Once it has been confirmed that the cut-off points around the circumference of the sheet material roll are all at the same distance from the end of the roll, the roll-trimming machine is then aligned and ready for operation.

Figure 10:
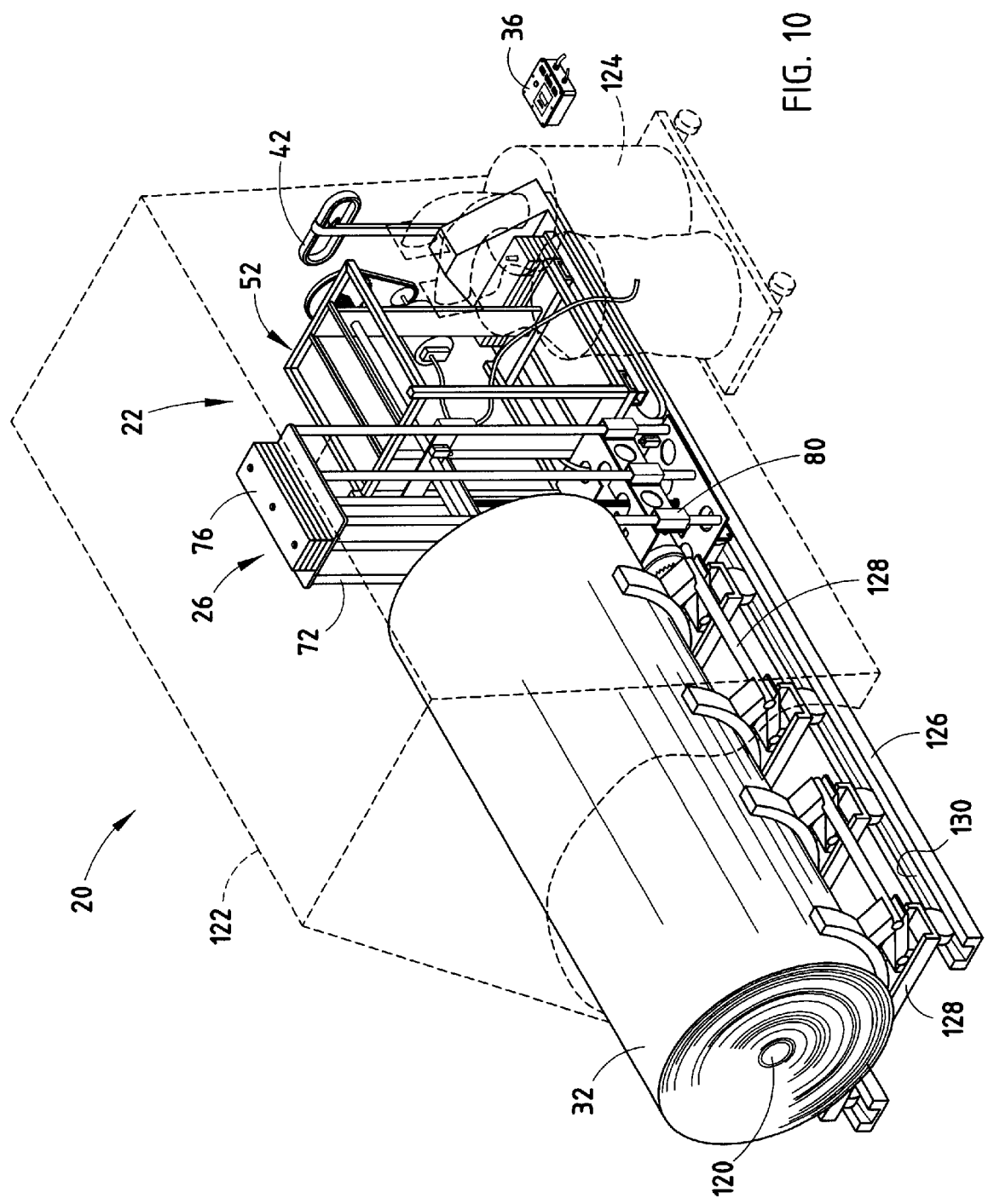
FIG. 10 is a perspective view of a dust collection system enclosing the roll-trimming machine and a portion of a roll being trimmed.
Figure 11:
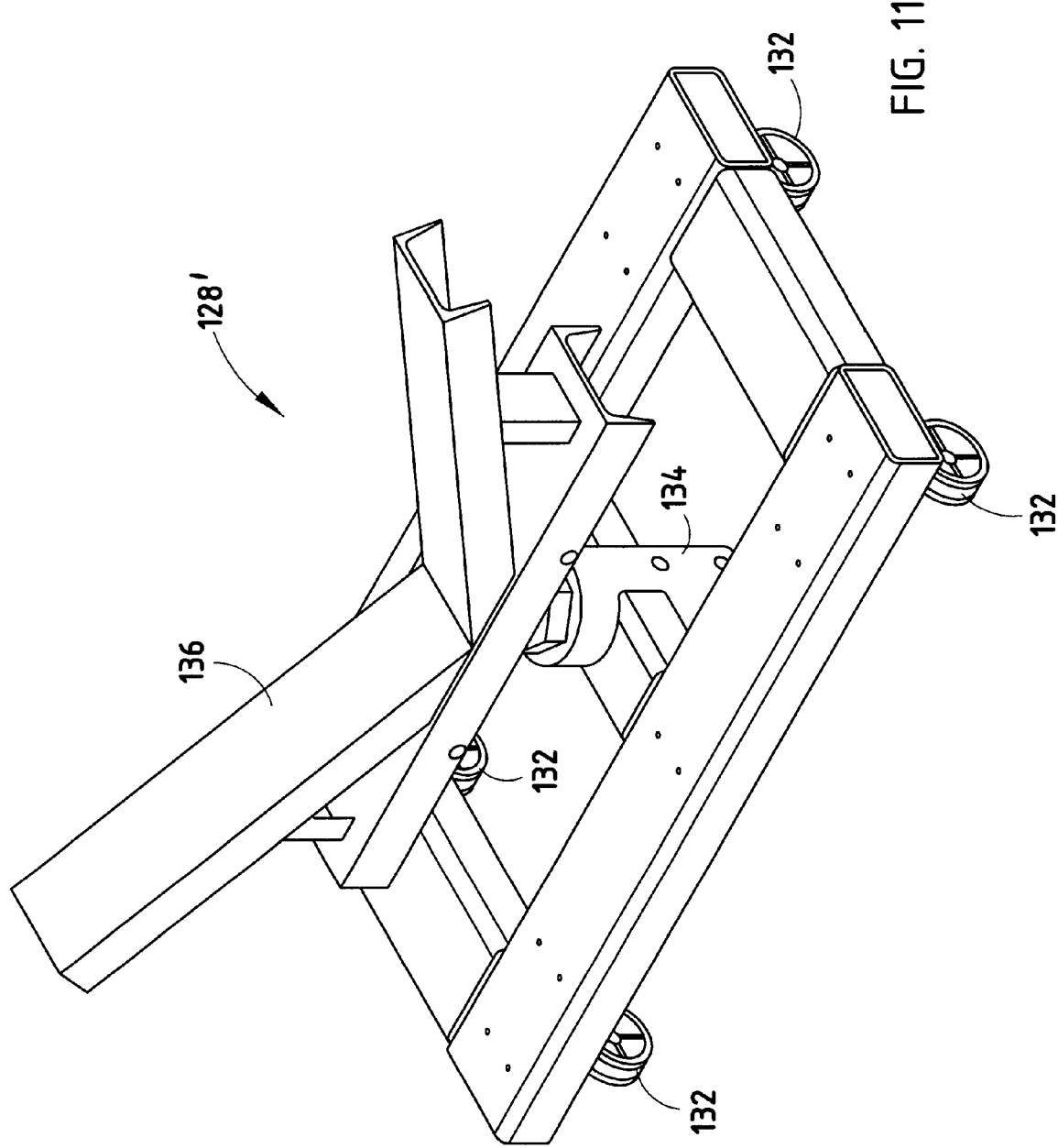
FIG. 11 is a perspective view of an alternate embodiment of a cradle for supporting the rail.
Figure 12:
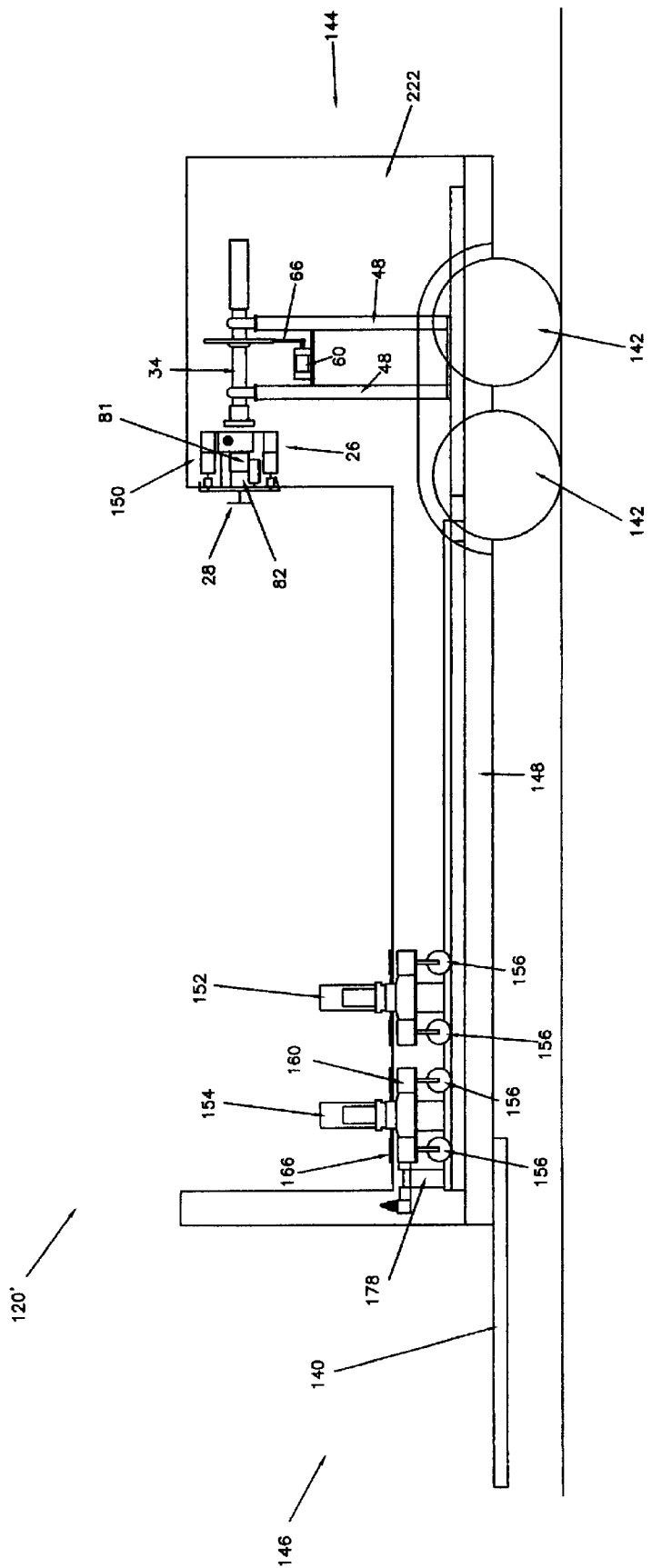
FIG. 12 is a side, elevational view of a roll-trimming machine according to another embodiment of the present invention.

An alternative manner for carrying out the precise alignment of center shaft 34 with the core of the paper roll involves the use of alignment track 126 (FIGS. 1 and 10). Alignment track 126 provides a track on which both paper roll 32 and roll-trimming machine 20 are positioned. By positioning both of these on the same track, the alignment of center shaft 34 with the paper roll core is greatly facilitated. Alignment track 126 can take on a variety of different forms but should be constructed in such a manner as to ensure that the roll-trimming machine and paper roll are aligned straight with the track. One manner for ensuring this alignment is by providing channels 130 on the track for the wheels of roll-trimming machine 20 and the paper roll cradles. If the channels 130 are the same width as the width of the wheels, then there should be no room for improper alignment. In the current embodiment, the paper roll is positioned on two height adjustable cradles 128. The height of each of the cradles 128 can be independently adjusted, if necessary, in order to make fine-tuning adjustments in the vertical alignment of the roll-trimming machine with the paper roll. The channels 130 may include sloped ends in order to allow the wheels to be ramped up and into the channels. It will be understood that roll-trimming machine 20 can be used without alignment track 126, if desired, and that various modifications can be made to alignment track 126. It will be further understood that various types of cradles 128 can be used in conjunction with alignment track 126. One such alternative cradle 128' is depicted in FIG. 11. Cradle 128' includes four non-castered wheels 132 that are rigidly secured to cradle 128' such that cradle 128' can only be rolled in one direction. This helps ensure proper alignment of the paper roll with the roll-trimming machine. Cradle 128' further includes a height adjustment mechanism 134 for adjusting the height of a support bar 136. Height adjuster 134 can be a hydraulic, pneumatic, mechanical or any other conventional type of height adjustment mechanism.

The actual cutting of the roll of sheet material 32 typically tends to create a significant amount of airborne dust, especially if the sheet material is paper. In order to avoid distributing dust throughout a warehouse, a dust collection chamber 122 is positioned over the entire roll-trimming machine 20 and a portion of roll 32 (FIG. 10). Dust collection chamber 122 includes a conventional vacuum system 124 which helps contain the airborne dust particles by filtering the air through the vacuum system. Vacuum system 124 is activated prior to starting the roll-trimming process. After vacuum system 124 has been activated, saw motor 82 is activated, which causes the saw blade to rotate. Start button 106 is then depressed to cause saw motor 82 to move radially inward toward center shaft 34. As the saw blade moves radially inward, it comes into contact with the roll of sheet material 32 and begins to cut into the roll. After the outer diameter of the roll of sheet material has been cut, the speed of movement radially inward of the saw blade can be increased due to the decreased diameter. The increase in speed, if desired, is accomplished by depressing fast button 110. The amount of speed increase, or decrease, can be generally determined by watching the discharge from the saw blade. If the radially inward feed speed is too great, the saw will not be able to discharge the blade's kerf paper debris fast enough, and the saw may bog down or stall. In such a case, the radially inward feed speed should be decreased.

The saw blade will continue to cut the end off the roll of paper by cutting the roll in ever-decreasing circumferences. When the saw blade has reached center shaft 34, the upper limit switch will be activated, and the radially inward movement of saw motor 82 will stop. At this point, the entire end of the roll of sheet material should be cut off. If it is not, manual override button 118 can be depressed and saw motor 82 moved still closer to center shaft 34 to cut off any remaining portions of the roll. After the end of the roll has been trimmed off, the motors on the roll-trimming machine are shut off, and the dust collection chamber is removed. If additional fine cutting is desirable to smooth any roughness, the entire process can be repeated with a finer-toothed blade.

Another embodiment of a roll-trimming machine 20' is depicted in FIGS. 12–25. The same numbers are used to designate like parts in roll-trimming machines 20 and 20'. Roll-trimming machine 20' includes a trailer 140 having one or more wheels 142 positioned adjacent a back end 144 of trailer 140. A hitch (not shown) is positioned at a front end 146 of trailer 140. The hitch is adapted to allow the trailer to be towed by a motor vehicle, such as a car or truck. The trailer includes all necessary components to meet the requirements for being driven on a road, such as break lights, indicator lights, etc.

Trailer 140 includes a base 148 on which a cutting unit 150 is mounted. Cutting unit 150 is depicted schematically in FIGS. 12–13 and 24–25 with some detail omitted for clarity. Cutting unit 150 is substantially the same as that disclosed in roll-trimming machine 20. Cutting unit 150 includes a rotary arm unit 26, a saw 28, a rotary motor 60, a chain 66, a central shaft 34, a pair of shaft supports 48, and a saw motor assembly 81. Rotary motor 60 causes center shaft 34 to rotate, thereby rotating rotary arm unit 26. As rotary arm unit 26 rotates, saw motor assembly 81 moves along linear bearings towards center shaft 34. While moving towards center shaft 34, saw 28 is operated and cuts into the roll of sheet material at an ever increasing depth until an end of the roll has been trimmed off. Because cutting unit 150 is affixed to base 148 of trailer 140, there is no need for counter weights 58. Otherwise, all of the support, saw, and rotary arm components of roll-trimming machine 20 are present in roll-trimming machine 20'.

Figure 13:
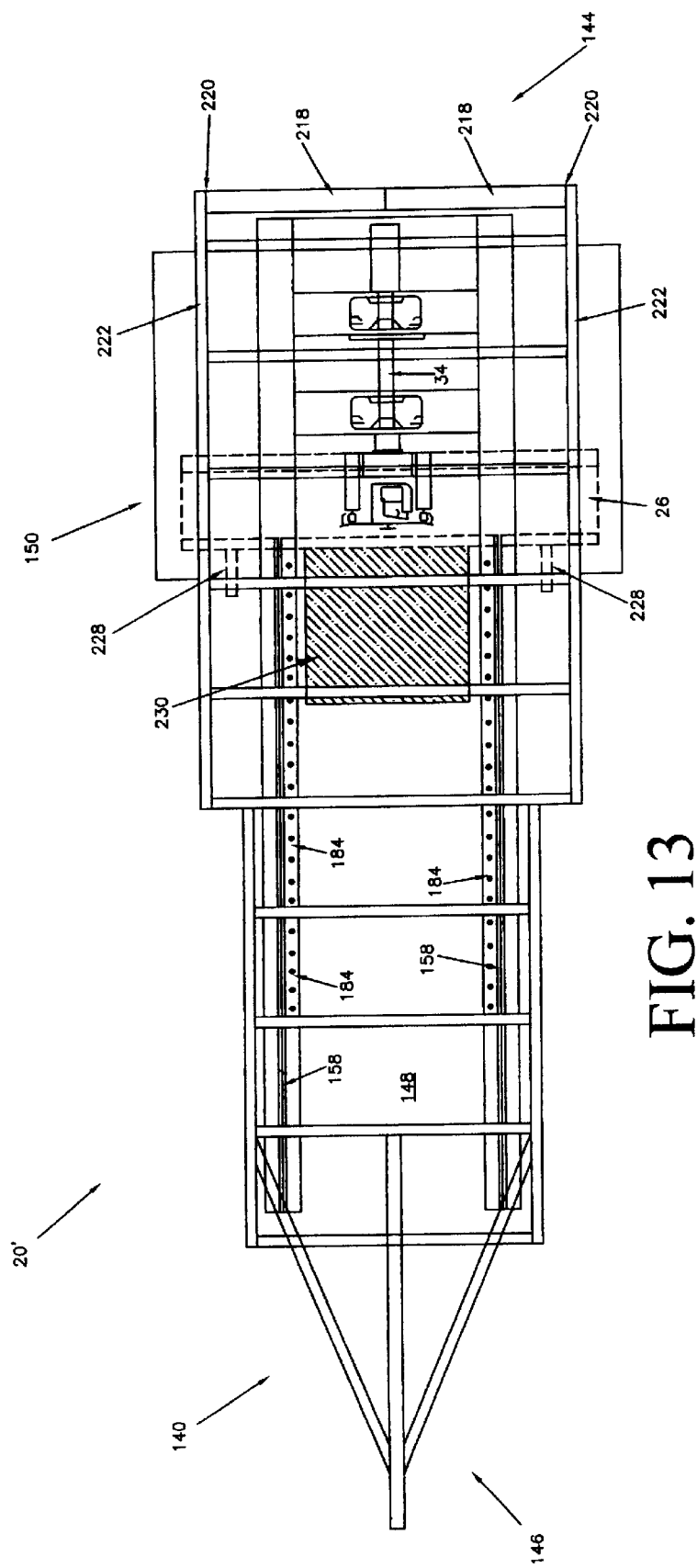
FIG. 13 is a plan view of the roll-trimming machine of FIG. 12.

Roll-trimming machine 20' further includes a first cart 152 and a second cart 154 positioned on top of base 148 of trailer 140. First and second carts 152 and 154 each include wheels 156 which allow carts 152 and 154 to be moved toward and away from back end 144 of trailer 140. Stated alternatively, first and second carts 152 and 154 can be selectively moved towards or away from cutting unit 150. First and second carts 152 and 154 are designed to support a roll of sheet material 32 which is to be trimmed (e.g. FIG. 25). Carts 152 and 154 support such a roll of sheet material when the central, longitudinal axis of the roll of sheet material is horizontally oriented. As shown in FIG. 13, first and second carts 152 and 154 move in tracks 158 defined in the top surface of base 148 of trailer 140. Tracks 158 have a width that is substantially equal to the width of wheels 156, thereby preventing first and second carts 152 and 154 from being able to move in a side-to-side direction. First and second carts 152 and 154 are able to move independently of each other toward and away from cutting unit 150. When a roll of sheet material is to be placed upon carts 152 and 154, they are first appropriately spaced from each other in order to accommodate the size of the roll being trimmed. Thereafter, the roll of sheet material 32 is placed on top of the carts 152 and 154. After the sheet material is placed on the carts, the weight of the roll of sheet material causes first and second carts 152 and 154 to move simultaneously when either pushed toward or away from cutting unit 150. If the weight of the roll of sheet material is insufficient to cause carts 152 and 154 to move uniformly toward or away from cutting unit 150, a solid piece of material could be placed between carts 152 and 154. Additionally, the two carts could then be tied together. In such a condition, the movement of one cart would cause the other cart to move in the same manner toward or away from cutting unit 150.

After a roll of sheet material has been placed on carts 152 and 154, it is necessary to ensure that the center axis of the roll of sheet material is parallel to, and aligned with, center shaft 34 of cutting unit 150. Only when these are parallel and aligned will cutting unit 150 be able to trim off an end of the sheet material in a manner that leaves a cut surface that is perpendicular to the central axis of the roll of sheet material. In order to ensure that the center axis of the roll of sheet material is parallel and aligned with center shaft 34, first cart 152 is provided with both a vertical and side-to-side adjustment mechanism, and second cart 154 is provided with both a vertical and fore-aft adjustment mechanism.

The construction of second cart 154 is depicted in FIGS. 14–18. Second cart 154 includes a base 160 to which wheels 156 are attached. Wheels 156 are attached in a non-castered manner in order to ensure that cart 154 can only move in a fore-aft direction. A height adjustment mechanism 162 is positioned in the middle of, and attached to, base 160. A roll support 164 is attached to the top of height adjustment mechanism 162. A pair of handles 166 are positioned on opposite sides of height adjustment mechanism 162. Rotation of handles 166 about a vertical axis causes roll supports 164 to either be raised or lowered. The operation of height adjustment mechanism 162 can best be understood by reference to FIG. 16.

Figure 16:
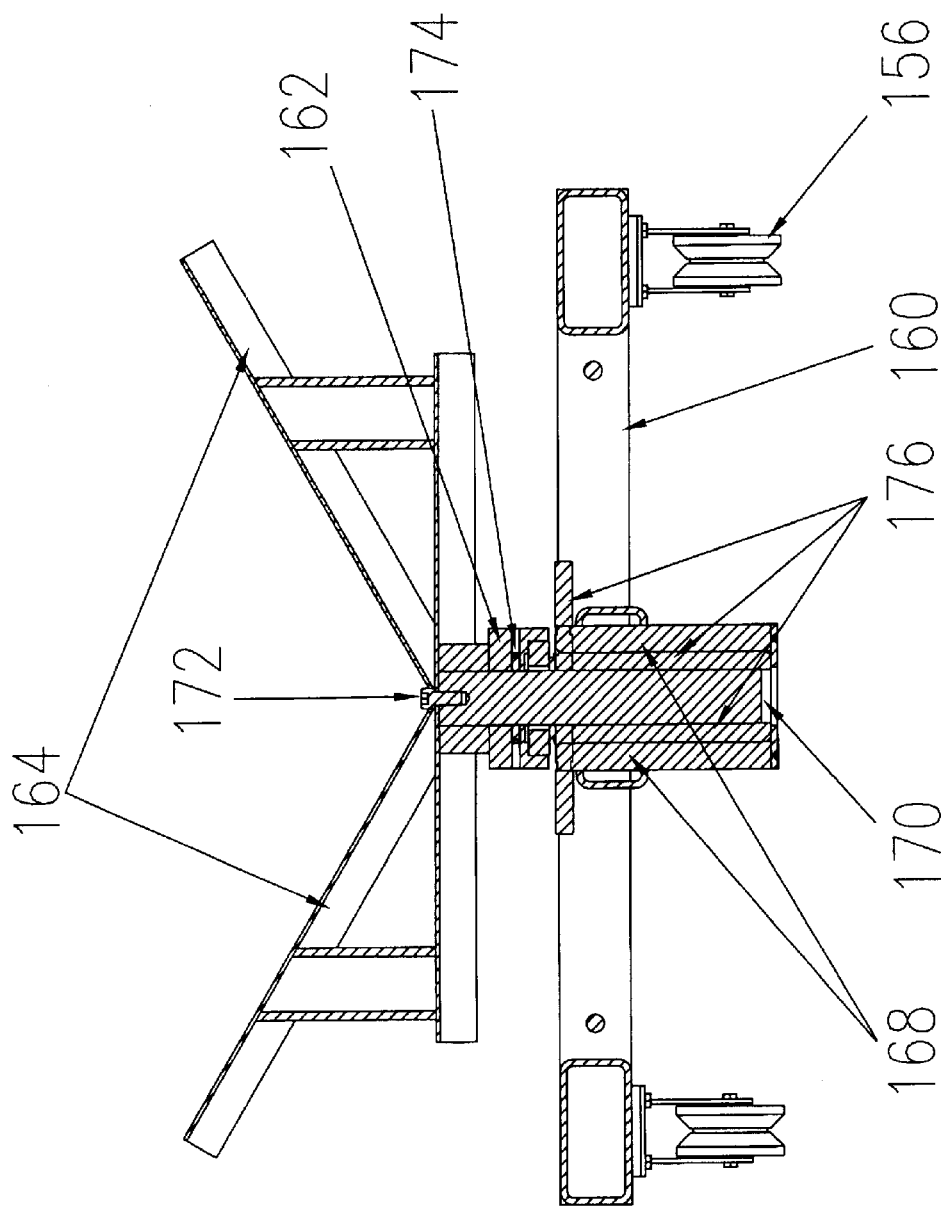
FIG. 16 is a sectional view taken along the line XVI—XVI in FIG. 15.

FIG. 16 illustrates a cross sectional view of second cart 154, including the internal structure of height adjustment mechanism 162. Height adjustment mechanism 162 includes a cylindrical support 168 that is rigidly secured to base 160. Cylindrical support includes an internal, non-threaded cylindrical bore into which a height adjustment pin 170 is inserted. Height adjustment pin 170 is secured to roll support 164 at its top end by way of a screw 172. Height adjustment pin 170 is externally threaded. A collar 174 is positioned around the top end of height adjustment pin 170. Collar 174 is internally threaded and rests on top of a staging pin 176. Collar 174 has handles 166 attached to it and is rotatable. As shown in FIG. 16, height adjustment mechanism 162 is in its lower-most position. By rotating collar 174, the internal threads of collar 174 act with the external threads of height adjustment pin 170 to thereby cause height adjustment pin 170 to move vertically upward. By selectively rotating collar 174 via handles 166, the height of roll support 164 can be precisely controlled. As noted, collar 174 rests on top of a staging pin 176. A number of staging pins with different heights are preferably stored on trailer 140. This allows for rapidly changing the height of roll support 164 when no roll is supported on it, rather than being forced to change the height by rotating collar 174 for a long period of time. Roll support 164 and height adjustment pin 170 can be removed out of cylindrical support 168. Thereafter, staging pin 176 can be replaced with another staging pin having a different height. The height of staging pin 176 should be selected to correspond generally to accommodate the diameter of the roll of sheet material being trimmed. After the appropriately sized staging pin 176 is selected, it is placed over the top of cylindrical support 168. Height adjustment pin 170 and roll support 164 are then inserted into an opening of staging pin 176. Rotation of collar 174 provides precise adjustments to the height of roll support 164.

Figure 14:
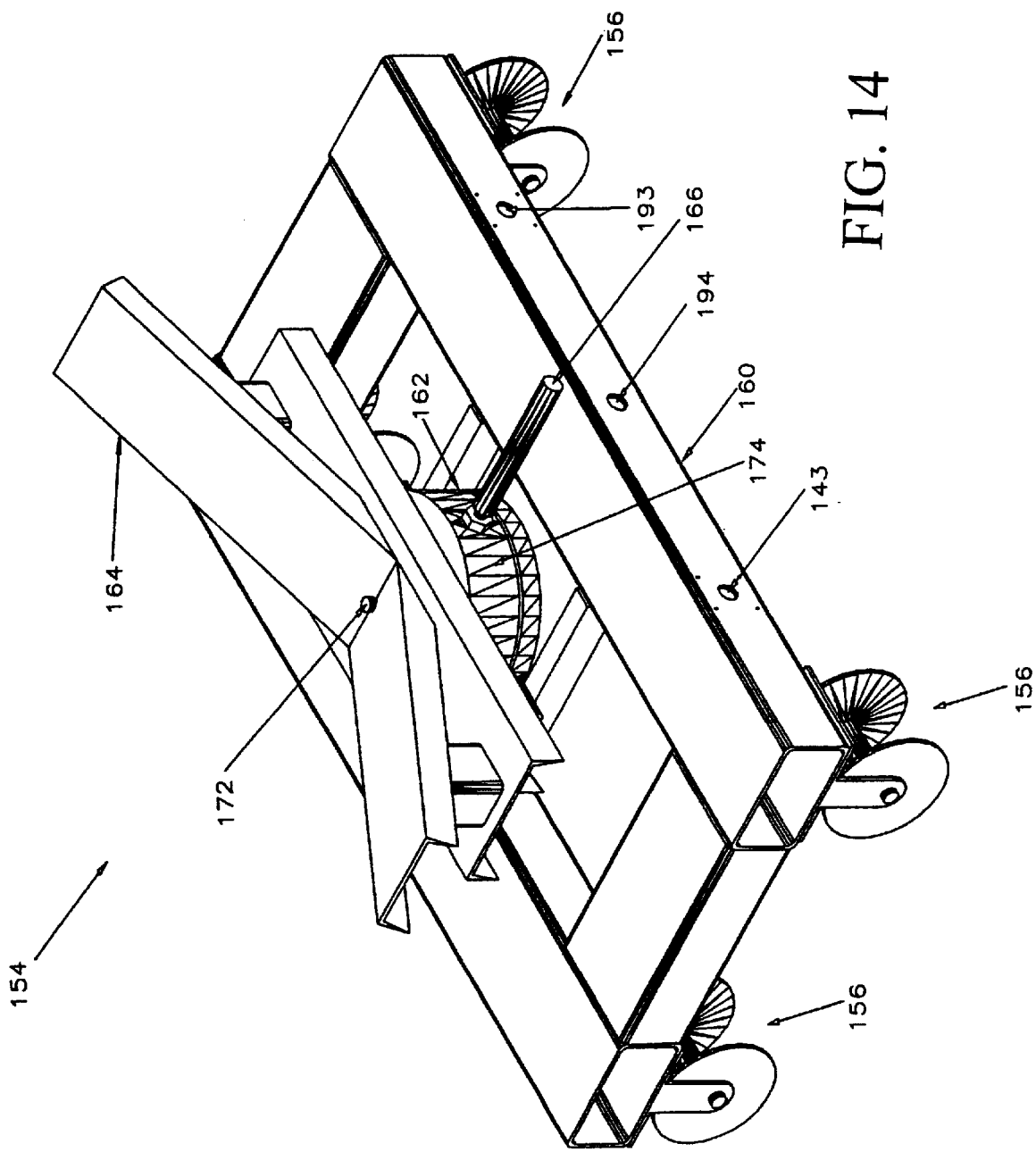
FIG. 14 is a perspective view of a first cart used for supporting a roll of sheet material according to one aspect of the present invention.
Figure 15:
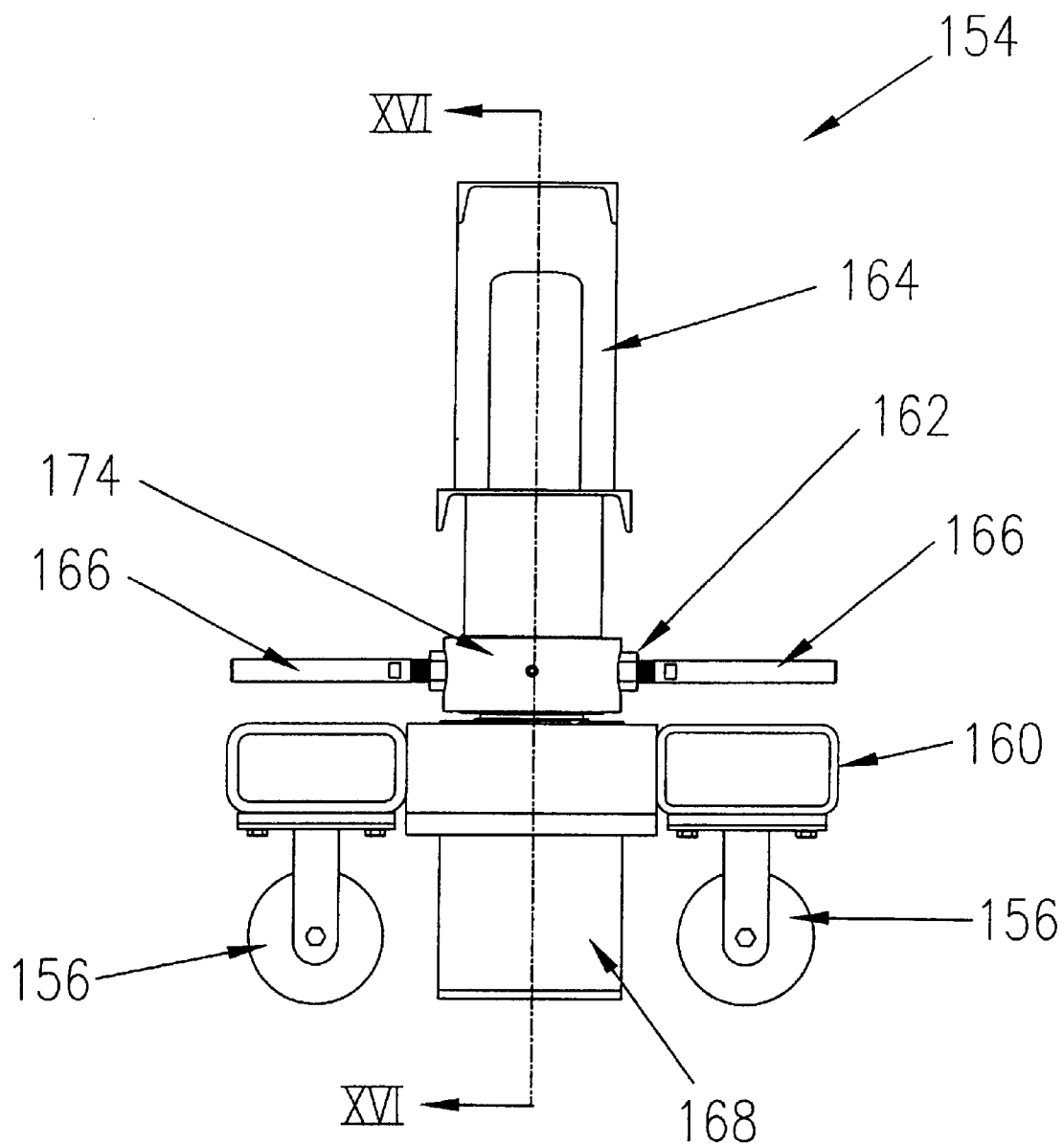
FIG. 15 is a side, elevational view of the cart of FIG. 14.
Figure 17:
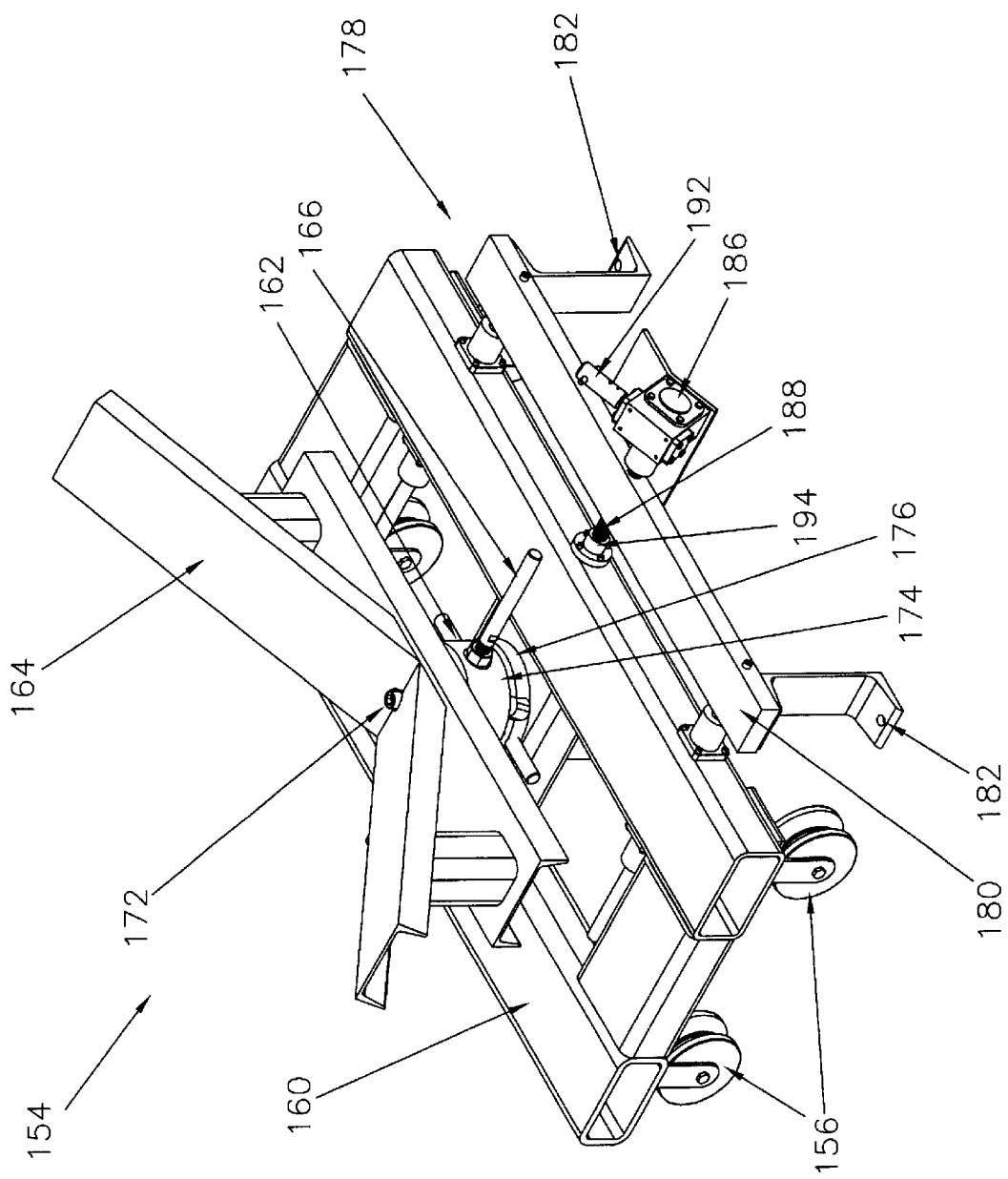
FIG. 17 is a perspective view of the first cart and a stationary member according to one aspect of the present invention.
Figure 18:
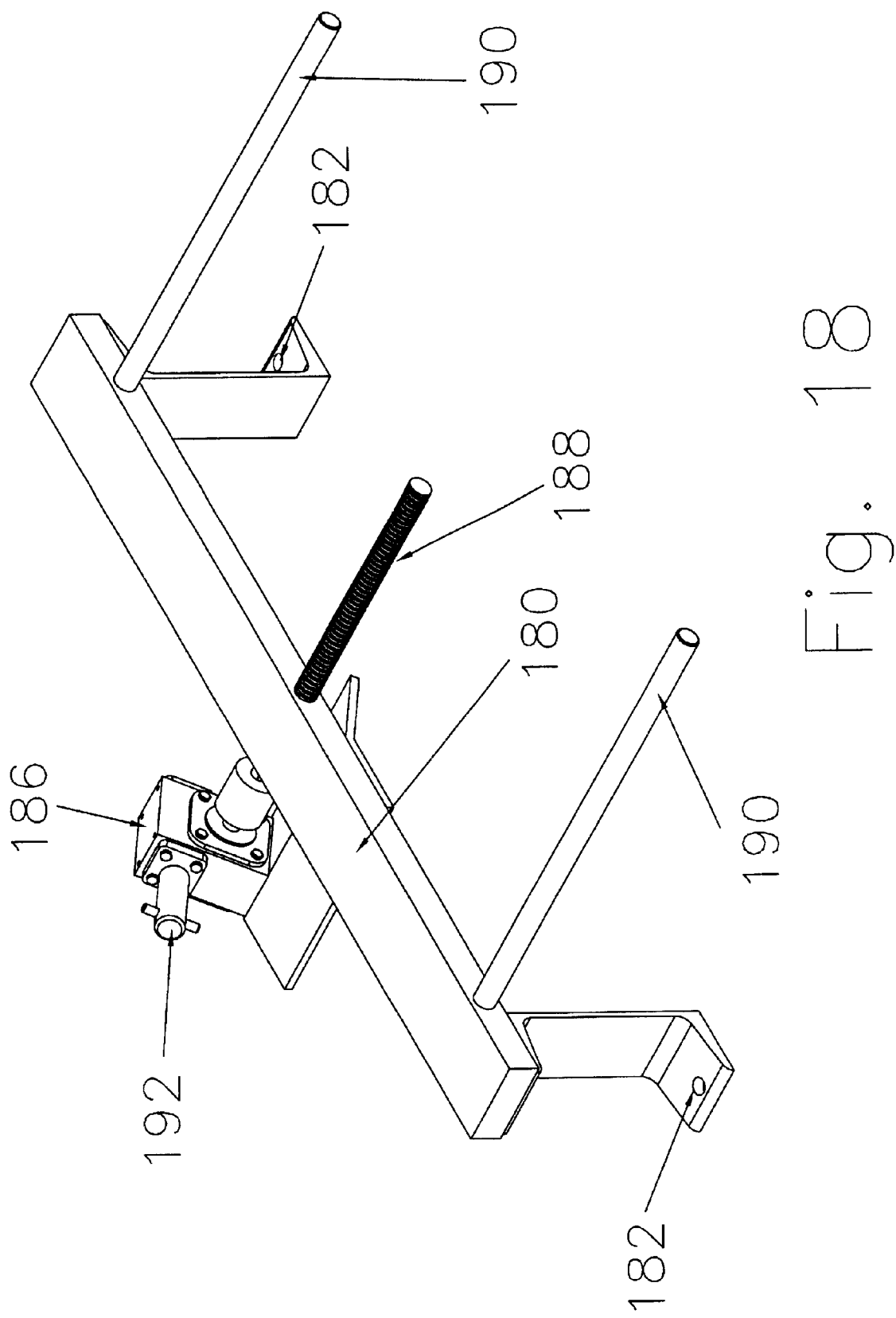
FIG. 18 is a perspective view of a portion of a fore-aft adjustment mechanism.
Figure 19:
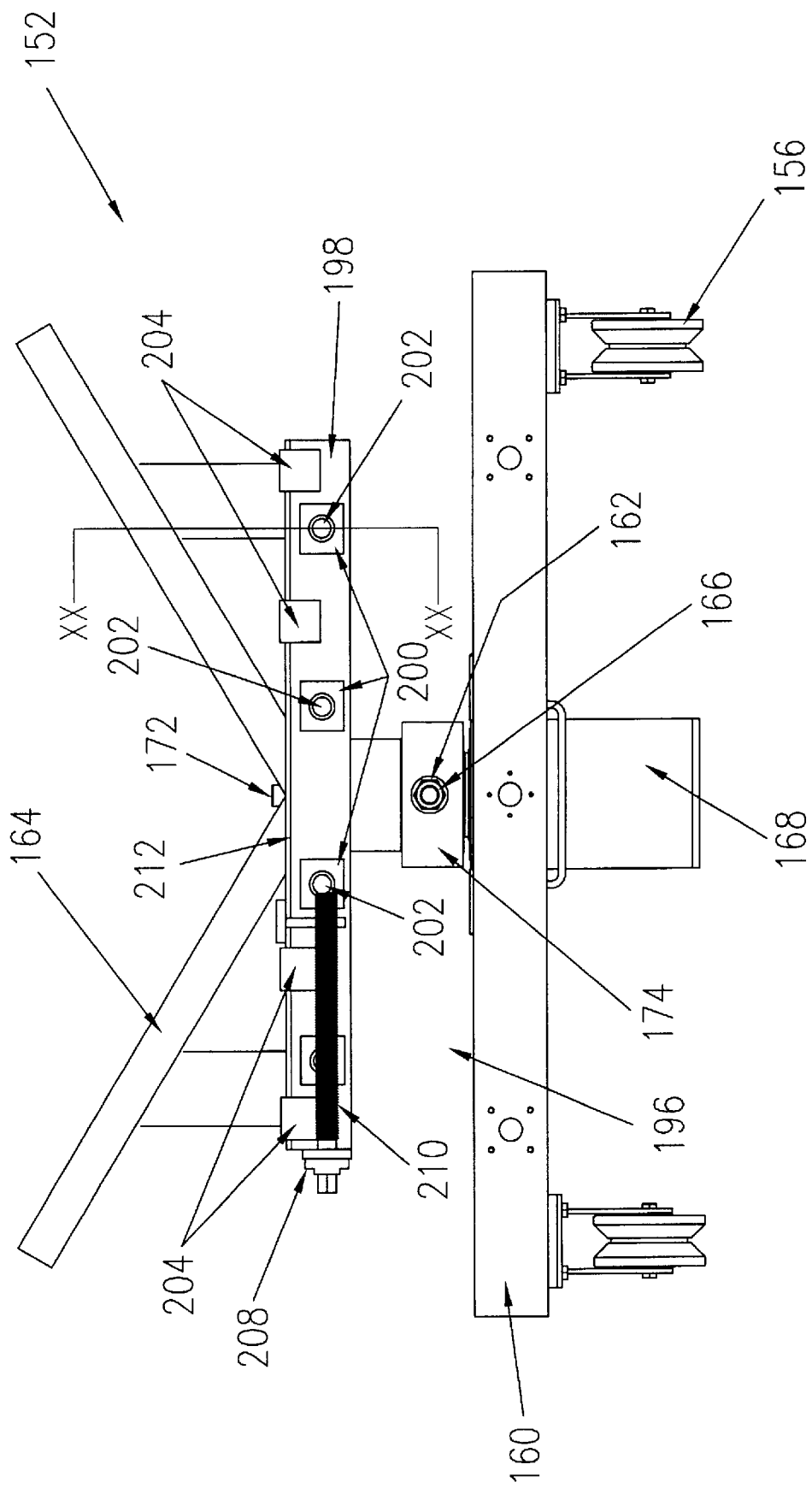
FIG. 19 is a front, elevational view of the cart of FIG. 17.
Figure 20:
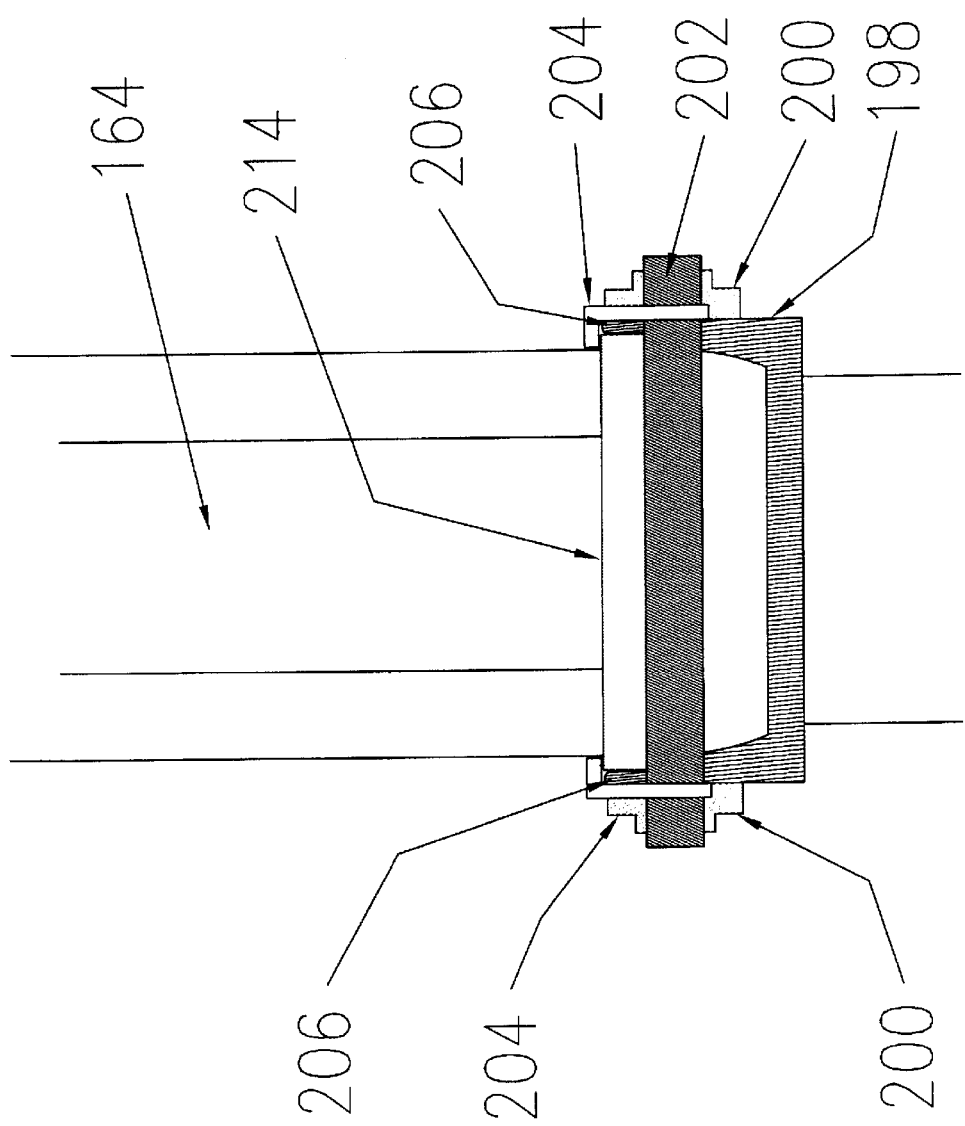
FIG. 20 is a sectional view taken along the line XX—XX and FIG. 19.
Figure 21:
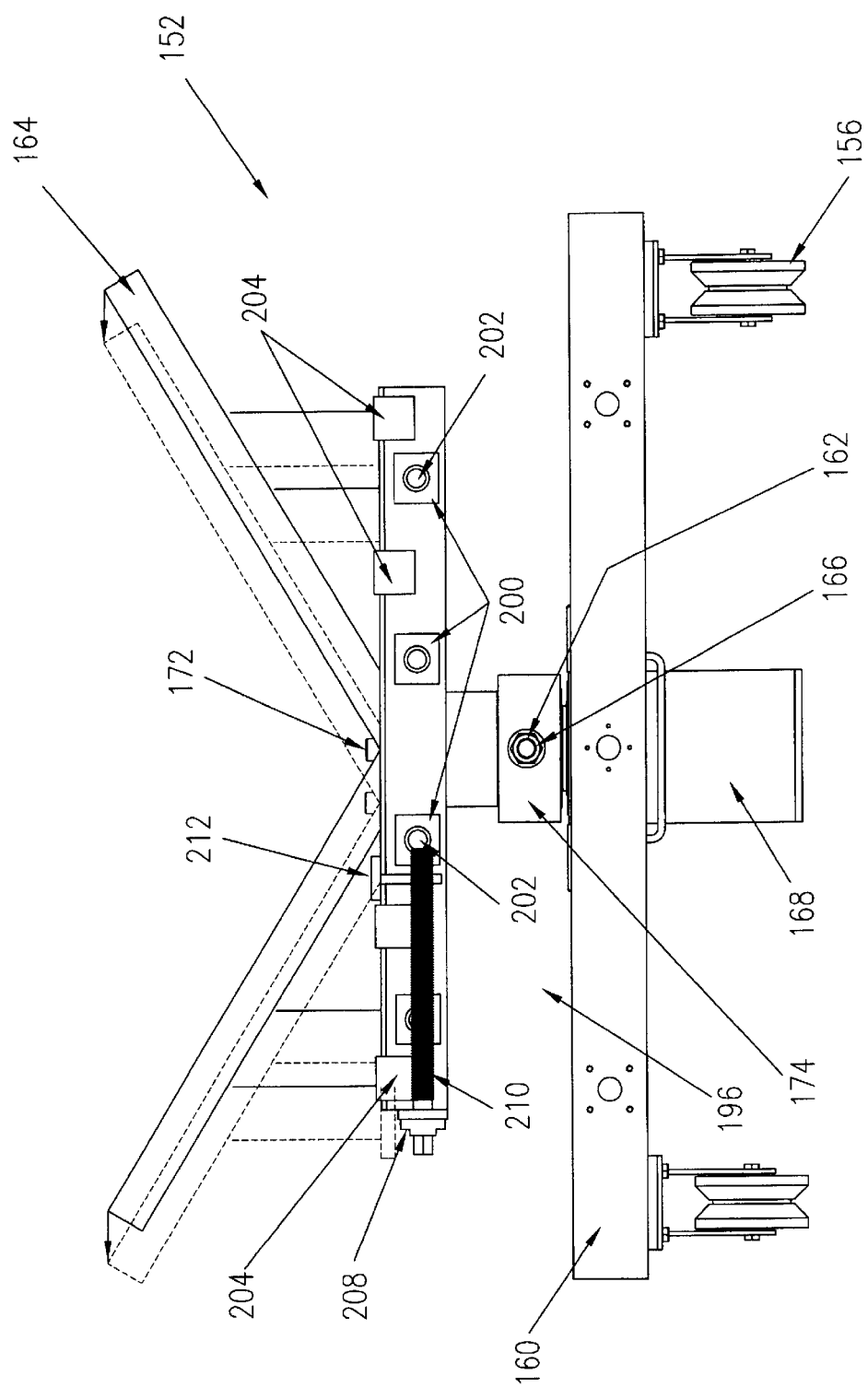
FIG. 21 is a front, elevational view of the cart of FIG. 17 illustrating a different roll support position in phantom.
Figure 22:
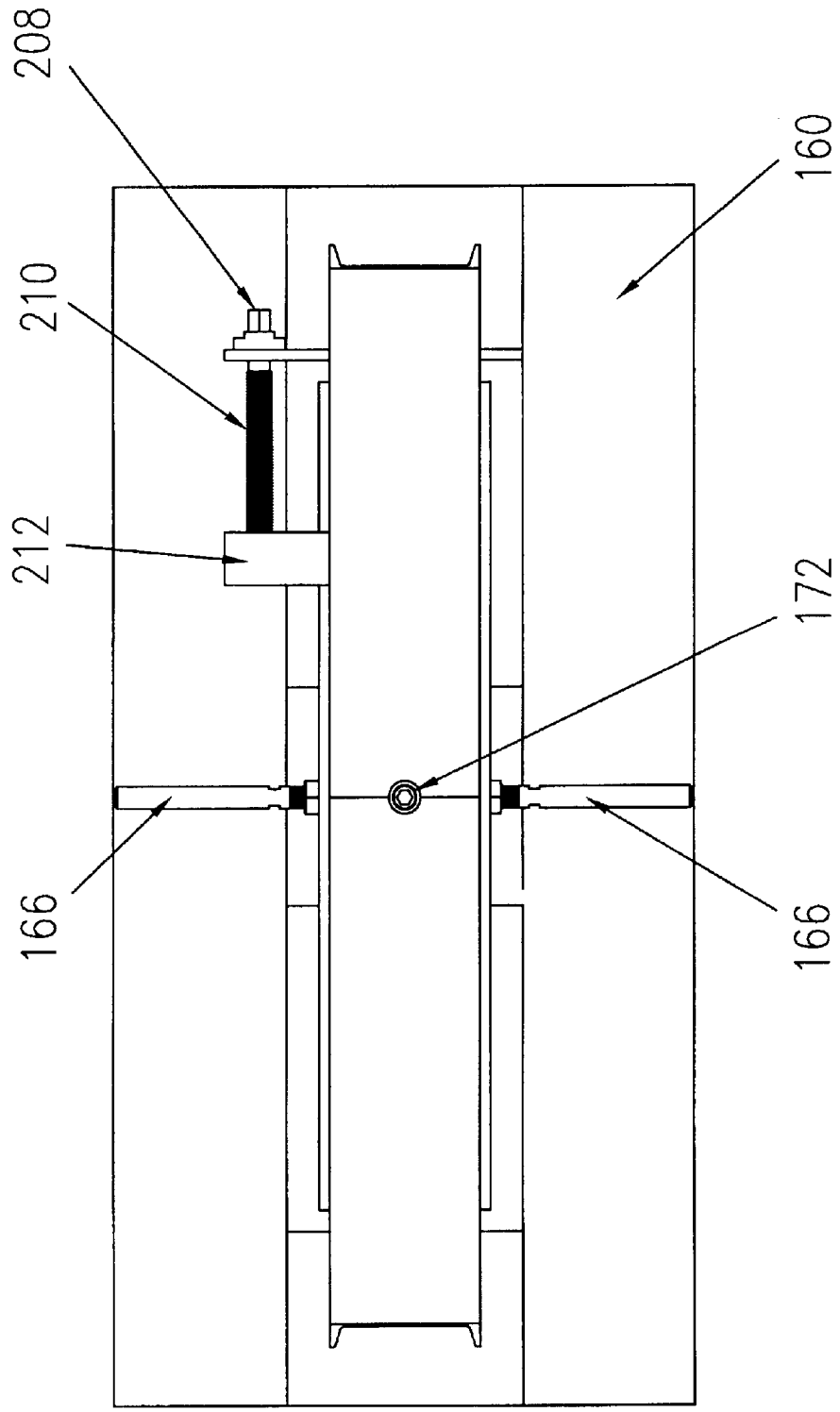
FIG. 22 is a plan view of the cart of FIG. 17.
Figure 23:
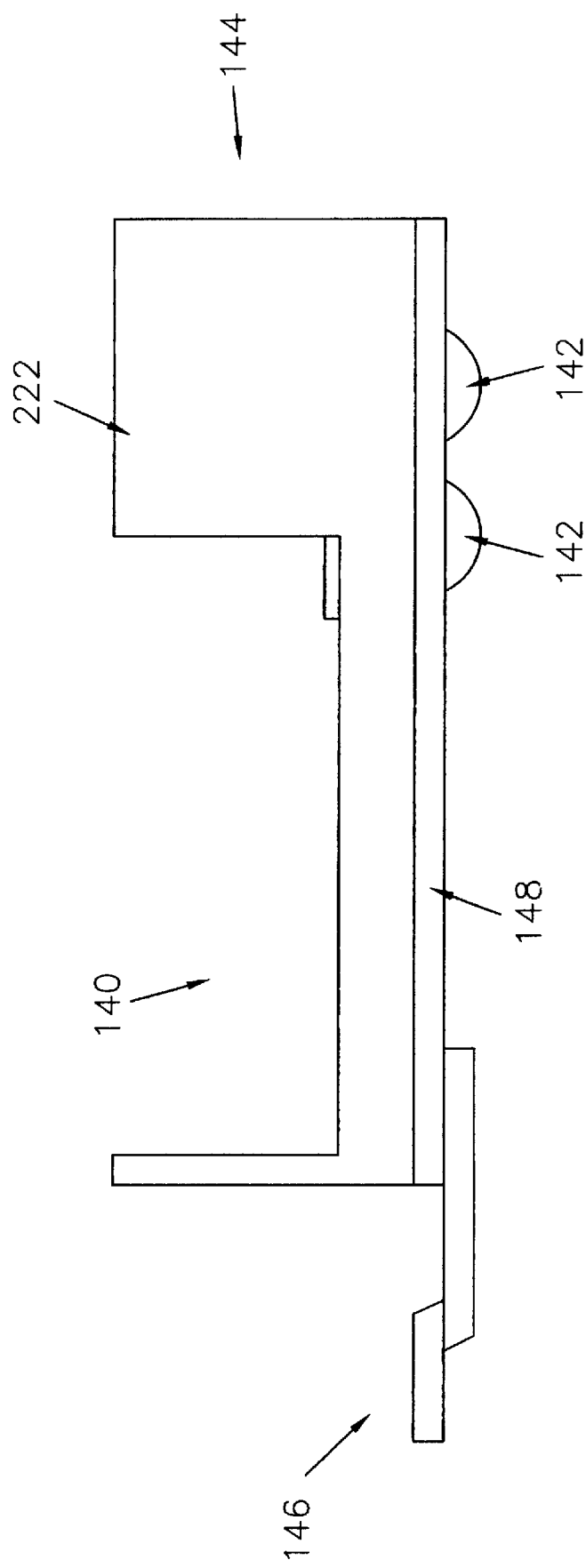
FIG. 23 is a side, elevational view of a trailer.
Figure 24:
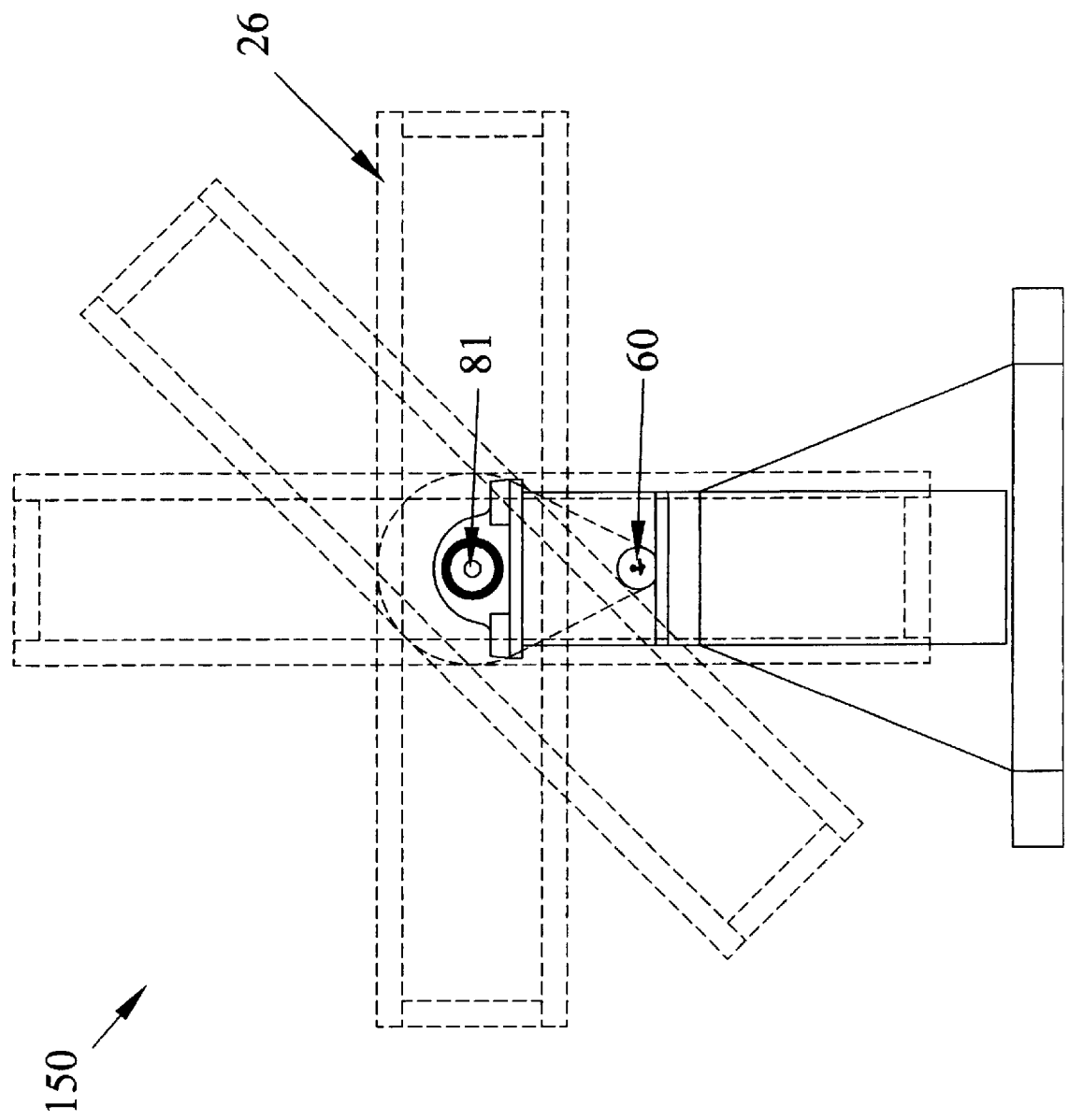
FIG. 24 is a rear, elevational view of the roll-trimming machine of FIG. 12, illustrating the movement of the roll-trimming arm in phantom.

A fore-aft adjustment mechanism 178 is attached to one end of second cart 154, as illustrated in FIGS. 17–18. Fore-aft adjustment mechanism 178 includes a stationary bar 180 having fastener apertures 82 defined in each of its ends. Fastener apertures 182 receive appropriately sized fasteners, such as screws, bolts, or the like, which are inserted into corresponding apertures 184 defined in the bottom of tracks 158. The fasteners securely fasten stationery bar 180 to tracks 158 at a stationary position. Stationary bar 180 further includes a gear box 186, a threaded shaft 188, and a pair of alignment shafts 190. Gearbox 186 includes a conventional drill receiver 192. Drill receiver 192 is adapted to receive a conventional drill, such as a hand-powered or electric drill. When the conventional drill is inserted into drill receiver 192 and operated, gear box 186 transfers the rotation of the drill to threaded shaft 188, thereby causing threaded shaft 188 to rotate. Threaded shaft 188 fits into an internally threaded bore 194 in the center of second cart 154. Rotation of threaded shaft 188 thereby causes second cart 154 to either move toward or away from stationary bar 180, depending upon the direction of rotation of threaded shaft 188. By causing second cart 154 to move toward or away from stationary bar 180, second cart 154 is also moved closer or further away from cutting unit 150 on trailer 140. Fore-aft adjustment mechanism 178 thereby controls the fore-aft distance of second cart 154 from cutting unit 150. It will be noted that the use of an electric drill allows relatively short fore-aft adjustments to be made, while a hand drill allows very precise adjustments to be made to the fore-aft distance from cutting unit 150. Alignment shafts 190 are each non-threaded shafts that fit into corresponding non-threaded bores 193 defined in second cart 154 (FIG. 14). Alignment shafts 190 keep second cart 154 aligned with cutting unit 150 while fore-aft adjustment mechanism 178 is being used to adjust the fore-aft position of second cart 154.

First cart 52 is depicted in FIGS. 19–22. In the preferred embodiment, first cart 152 does not include its fore-aft adjustment mechanism, but rather moves in unison with second cart 154 due to the weight of sheet material being trimmed, which may weigh up to and beyond 10,000 lbs. First cart 152 includes a side-to-side adjustment that is not present in second cart 154, in the current embodiment. This side-to-side adjustment 196 allows roll support 164 to roll along a frame 198 in a side-to-side movement. Frame 198 includes a plurality of bearings 200 which each support rollers 202. Rollers 202 extend through frame 198 in a fore-to-aft direction and rollingly support a cradle plate 214 on which roll support 164 is mounted. In the embodiment illustrated in FIGS. 19–22, first cart 152 includes four sets of rollers 202. A different number of rollers can, of course, be used within the scope of the invention. Side-to-side adjustment mechanism 196 further includes a plurality of keepers 204 which are fixedly mounted to frame 198 at their lower end. Keepers 206 each include an upper flange 206 which extends partially over a cradle plate 214. Upper flange 206 prevents cradle plate 214 and roll support 164 from being detached from frame 198. The side-to-side movement of roll support 164 on frame 198 is controlled by a screw assembly 208. Screw assembly 208 includes a threaded screw 210 which is rotatably supported on one end of frame 198. The other end of threaded screw 210 is inserted through an internally threaded aperture defined in a plate 212. Plate 212 is fixedly attached to cradle plate 214. The rotation of threaded screw 210 in the internally threaded aperture of plate 212 causes plate 212 to move either toward or away from the fixed end of threaded screw 210. In other words, the rotation of threaded screw 210 causes plate 212 to move in a side-to-side fashion. Because plate 212 is fixedly attached to roll support 164, the rotation of threaded screw 210 causes roll support 164 to move in a side-to-side fashion. Because the roll of sheet material is supported on cradle plate 214, the rotation of threaded screw 210 thereby causes a side-to-side adjustment in the position of the sheet material roll 32.

First cart 152 also includes a vertical height adjustment mechanism 162' which is virtually identical to height adjustment mechanism 162 of second cart 154. Height adjustment mechanism 162' is the same as adjustment mechanism 162 in all respects except for height adjustment pin 170 and screw 172. In height adjustment mechanism 162', height adjustment pin 170 is not attached directly to roll support 164 by screw 172. Rather, screw 172 attaches roll support 164 to cradle plate 214. Height adjustment pin 170 is attached to frame 198. This arrangement allows roll support 164 to move in a side-to-side manner while the height of frame 198 can still be adjusted..

Figure 25:
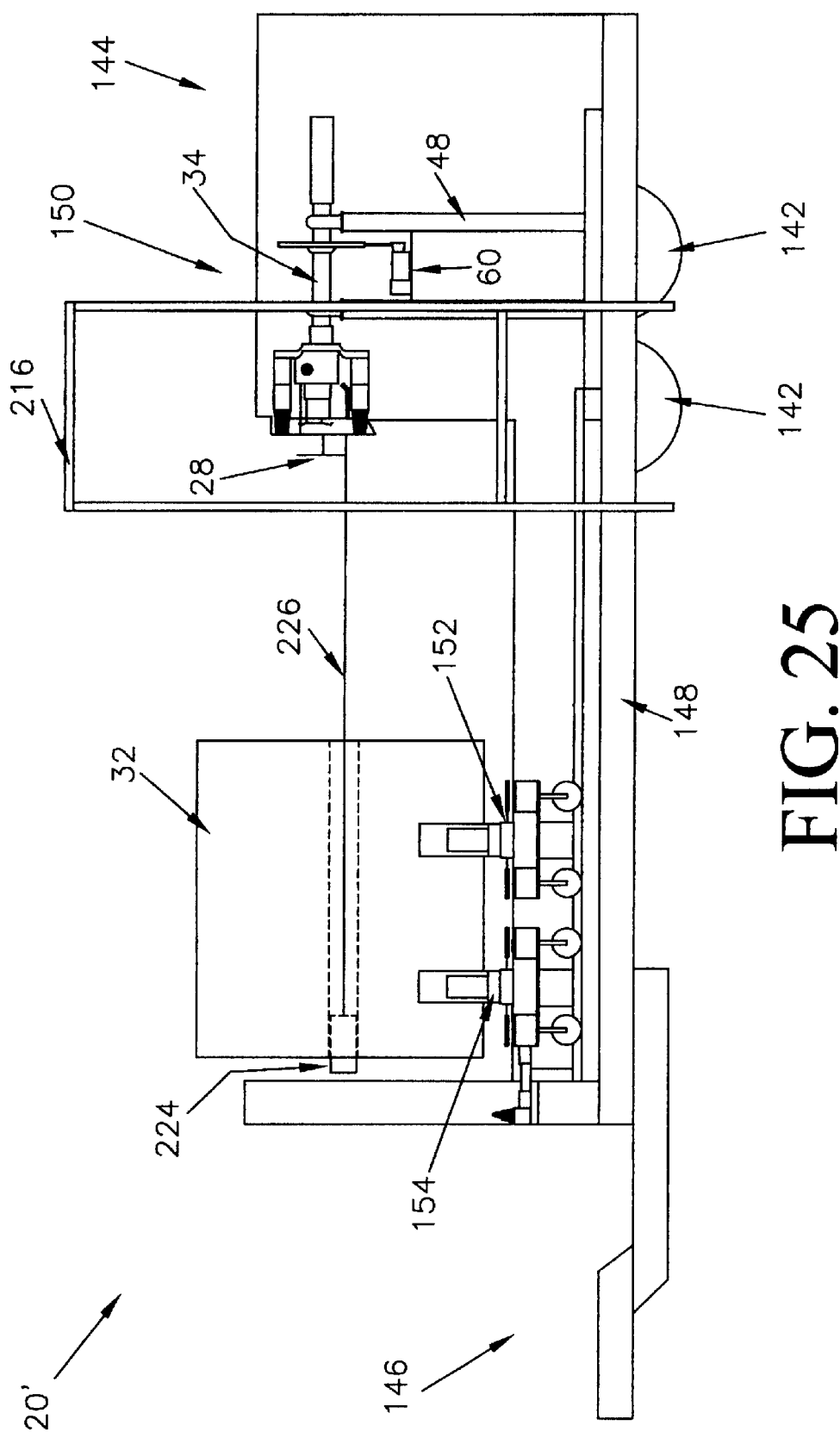
FIG. 25 is a side, elevational view of a roll-trimming machine illustrated with a dust containment support attached to the trailer.

As illustrated in FIG. 25, trailer 140 may include a dust cover frame 216 for supporting a dust cover. If the roll of sheet material that is being trimmed is a roll of paper, the trimming of the end of the roll typically will create a significant amount of paper dust. In order to contain that paper dust, it is desirable to place a dust cover over the cutting unit 150 and one end of the paper roll. A conventional vacuum filtration system can be attached to the dust cover to remove the paper dust from the air inside of the dust cover. Additionally, a dust hole 230 is defined in the base 148 of trailer 140 adjacent cutting unit 150 (FIG. 13). Dust hole 230 allows a dust bin (not shown) to be placed under trailer 140 and collect the majority of the falling paper dust.

Trailer 140 may also include a pair of rear doors 218 located at back end 144. Rear doors 218 open the long hinges 220 rearwardly and allow access to a control panel (not shown) located behind cutting unit 150. The control panel includes all of the controls contained within control box 36 of roll-trimming machine 20. A protective wall may be positioned between the control box and the rotary arm portion of cutting unit 150 for safety reasons. Sidewalls 222 of trailer 140 may also contain shelving for storing the various size staging pins that may be used with roll-trimming machine 20'.

In operation, roll-trimming machine 20' is first driven by car or truck to a location adjacent the roll of material to be trimmed. After the trailer is in the proper location, the trailer is leveled by using jacks which are located on the outside edge of the trailer (not shown). Digital levels may be used to ensure that the trailer 140 is securely positioned in a level orientation. The roll of sheet material which is to be trimmed is then placed on first and second carts 152 and 154. If a dust collection tarp or cover is to be used, this is then placed over one end of the roll of paper and the dust cover frame 216. The cover or tarp may be tied down with straps and snap buttons. After the dust cover is in place, the roll is then adjusted to ensure that it is properly aligned with cutting unit 150. As an optional step, rough alignment can be determined by use of a laser 224 positioned in the core of the roll of sheet material 32, as illustrated in FIG. 25. Laser 224 emits a laser beam 226 towards cutting unit 150. The location where laser beam 226 impinges cutting unit 150 may be useful in determining whether the roll of sheet material 32 is properly aligned with cutting unit 150. The laser beam 226 should be positioned to impinge cutting unit 150 at its very center to thereby ensure that saw 28 will make a complete cut of the end of the roll of sheet material.

Even if laser beam 226 impinges cutting unit 150 precisely at its center, it is still possible for the longitudinal axis of the roll of sheet material to not be parallel to center shaft 34, and thereby cause a cut that is not completely square to this axis. In order to ensure the proper parallel alignment, height adjustment mechanism 162 and side-to-side adjustment mechanism 196 are used on first and second carts 152 and 154. As an aid to achieving the desired alignment, it may be useful to mount a pair of alignment pegs 228 (FIG.13) to rotary arm unit 26. Alignment pegs 228 should be mounted along opposite sides of rotary arm unit 26. Each alignment peg 228 is precisely machined to have the exact same length. After they are mounted onto rotary arm unit 26, the roll of sheet material is rolled onto carts 152 and 154 until it contacts one or both of these alignment pegs 228. If it only contacts one of the pegs, then the roll of sheet material is not properly aligned with the cutting unit 150. Preferably, rotary arm unit is first positioned in a horizontal orientation to see if the roll of sheet material is properly aligned in a horizontal direction. If it is properly aligned, the roll of sheet material will contact both of the alignment pegs 228. If it isn't, it will only contact one. Adjustments then need to be made using side-to-side adjustment mechanism 196 until the roll of sheet material contacts both of the alignment pegs 228. After the horizontal alignment is complete, rotary arm unit 26 is then rotated to a vertical orientation, in which the vertical alignment of the roll of sheet material is checked. If both of the alignment pegs 228 contact the roll of sheet material while in the vertical orientation, then the roll is properly aligned in the vertical direction. If only one alignment peg is contacted in the vertical orientation, then adjustments are made using one or both of the height adjustment mechanisms 162 until the roll is properly aligned in a vertical orientation. After both the vertical and horizontal alignments have been completed, the roll of sheet material can be moved back from cutting unit 150 and alignment pegs 228 removed.

After the roll has been properly aligned and the alignment pegs 228 removed, the net step is to position the roll of material on tracks 158 at the proper depth so that the desired amount of material will be trimmed off the end of the roll. This is accomplished in a course fashion by inserting fasteners through fastener apertures 182 of fore-aft adjustment mechanism 178 and into the apertures 184 defined in tracks 158. The fasteners secure the fore-aft adjustment mechanism to the tracks at a position that is generally close to the desired depth of the cut to be made. After this fastening has been completed, a drill is inserted into drill receiver 192 and the fine adjustments are made using fore-aft adjustment mechanism 178 and the drill. After the desired fore-aft position has been obtained, it is time to trim the end of the roll off. This is accomplished by starting the motor for rotary arm unit 26, the motor for saw 28, and the motor for the saw assembly. The cutting is accomplished in the same manner as previously described with respect to roll-trimming machine 20. After cutting is complete, it may be desirable to sand the cut end of the roll. This can be accomplished by replacing the cutting blade with a sanding disc and repeating the cutting steps. After the cutting and sanding are complete, the roll 32 is lifted off of trailer 140 and returned to its original position.

While the present invention has been described in terms of the preferred embodiments discussed in the above specification, it will be understood by one skilled in the art that the present invention is not limited to these particular preferred embodiments, but includes any and all such modifications that are within the spirit and scope of the present invention as defined in the appended claims.

The embodiments of the present invention in which an exclusive privilege or property is claimed are defined as follows:

1. A roll trimming machine comprising:
    a trailer adapted to be hitched to a car or truck;
    a support for holding a roll of sheet material, said support mounted on said trailer;
    a base supported on said trailer;
    a saw movably mounted to said base such that said saw is movable to cut an end off of the roll while the roll is supported on said support; and
    an adjustment mechanism for adjusting the position of said support with respect to said saw.

2. The roll trimming machine of claim 1 wherein said roll of sheet material is a roll of paper.

3. The roll trimming machine of claim 2 further including a dust collection system mounted on said trailer, said dust collection system adapted to limit the spread of dust generated from cutting said paper roll.

4. The roll trimming machine of claim 1 further including a laser beam positionable in a core of said roll in order to determine the alignment of the saw with said roll.

5. The roll trimming machine of claim 1 wherein said support includes a first and a second cradle.

6. The roll trimming machine of claim 5 further including a fore-aft adjustment mechanism on said first cradle for adjusting the horizontal distance of said first cradle from said saw.

7. The roll trimming machine of claim 5 further including a side-to-side adjustment mechanism on said first cradle for moving said roll from one side of said trailer towards the other side of said trailer.

8. The roll trimming machine of claim 1 wherein said saw includes a rotatable arm and a circular blade mounted for linear movement on said arm.

9. The roll trimming machine of claim 6 wherein said fore-aft adjustment mechanism comprises:
    a stationary member affixed to said trailer;
    a cart having at least one threaded aperture; and
    a screw rotatably mounted to said stationary member and positioned in said threaded aperture such that rotation of said screw causes said cart to move either toward or away from said stationary member.

10. The roll trimming machine of claim 7 wherein said side-to-side adjustment mechanism comprises:
    a pair of arms rollingly mounted on a base; and
    a screw assembly, said screw assembly adapted to move said arms from side-to-side when a screw in said screw assembly is rotated.

11. A roll trimming machine for trimming off an end of a roll of sheet material comprising:
    a first cart mounted on wheels for supporting a first end of the roll of sheet material
    a second cart mounted on wheels for supporting a second end of the roll of sheet material;
    a movable saw positioned adjacent said first and second carts and adapted to cut an end off of said roll of sheet material while the roll of material rests generally horizontally on said first and second carts; and
    a controller adapted to control the movement of said saw such that the end of a roll of sheet material positioned on said first and second carts can be trimmed by said saw.

12. The roll trimming machine of claim 11 wherein said saw, first and second cart, and said controller are mounted on a trailer adapted to be transported by a car or truck.

13. The roll trimming machine of claim 11 wherein said first cart includes a fore-aft adjustment mechanism for moving said first cart toward or away from said saw.

14. The roll trimming machine of claim 11 wherein said saw includes a rotatable arm and a circular blade mounted for linear movement on said arm.

15. The roll trimming machine of claim 13 wherein said fore-aft adjustment mechanism comprises:
    a stationary member;
    at least one threaded aperture defined in said first cart; and
    a screw rotatably mounted to said stationary member and positioned in said threaded aperture such that rotation of said screw causes said cart to move either toward or away from said stationary member.

16. The roll trimming machine of claim 11 wherein said first cart includes a side-to-side adjustment mechanism for moving said first cart in a direction perpendicular to a longitudinal direction of the roll of sheet material.

17. The roll trimming machine of claim 16 wherein said side-to-side adjustment mechanism comprises:
    a pair of arms rollingly mounted on a base; and
    a screw assembly, said screw assembly adapted to move said arms from side-to-side when a screw in said screw assembly is rotated.

18. The roll trimming machine of claim 11 wherein each of said first and second carts includes a height adjustment mechanism for adjusting the height of a roll of sheet material placed on said first and second carts.

19. The roll trimming machine of claim 11 wherein said controller is adapted to move said saw radially toward, and orbitally around an axis of the roll of sheet material.

* * * * *